(12) United States Patent
Okubo et al.

(10) Patent No.: US 6,946,519 B2
(45) Date of Patent: Sep. 20, 2005

(54) ORGANIC-INORGANIC HYBRID FILM, ITS MANUFACTURING METHOD, OPTICAL FILM, AND POLARIZING FILM

(75) Inventors: Yasushi Okubo, Hachioji (JP); Takahiro Takagi, Sagamihara (JP); Yasuo Kurachi, Tokyo (JP); Kaori Ono, Hino (JP)

(73) Assignee: Konica Corporation (JP)

( * ) Notice: Subject to any disclaimer, the term of this patent is extended or adjusted under 35 U.S.C. 154(b) by 23 days.

(21) Appl. No.: 10/640,616

(22) Filed: Aug. 13, 2003

(65) Prior Publication Data
US 2004/0044127 A1 Mar. 4, 2004

(30) Foreign Application Priority Data
Aug. 22, 2002 (JP) ........................................ 2002-241868

(51) Int. Cl.⁷ ............................ C08G 63/00; C09D 1/00
(52) U.S. Cl. ........................... 525/54.3; 536/58; 536/63; 536/76
(58) Field of Search ........................... 525/54.3; 536/58, 536/63, 76

(56) References Cited

FOREIGN PATENT DOCUMENTS

JP  5-09406  *  1/1993

* cited by examiner

Primary Examiner—James J. Seidleck
Assistant Examiner—Irina S. Zemel
(74) Attorney, Agent, or Firm—Muserlian, Lucas and Mercanti

(57) ABSTRACT

Disclosed are an organic-inorganic hybrid film comprising a cellulose derivative and a polycondensation product of a condensation polymerizable reactive metal compound, wherein the film contains a plasticizer in an amount of 1 to 20% by weight and its manufacturing method.

13 Claims, 2 Drawing Sheets

ORGANIC-INORGANIC HYBRID FILM, ITS MANUFACTURING METHOD, OPTICAL FILM, AND POLARIZING FILM

FIELD OF THE INVENTION

The present invention relates to an organic-inorganic hybrid film comprising a cellulose derivative and a metal oxide, its manufacturing method, an optical film such as an optical retardation film, a polarizing plate protective film or an anti-reflection film, the optical film comprising the organic-inorganic hybrid film, and a polarizing plate comprising the optical film.

BACKGROUND OF THE INVENTION

A cellulose derivative film is applied to an optical film such as a polarizing plate protective film, an optical retardation film, or an optical compensation film, since it has excellent optical properties.

It is essential that an additive such as a plasticizer or a UV absorbent be added to the cellulose derivative film in order to improve its processability or moisture vapor transmittance. However, the addition has a problem which causes bleeding-out or volatilization of the additive, resulting in lowering of dimensional stability and storage stability of the film.

A polarizing plate is generally one in which a polarizing plate protective film comprised of triacetyl cellulose is provided on both surfaces of a polarizing film comprised of a uniaxially stretched dichroic dye dyed polyvinyl alcohol, in order to shield light or moisture. A crystal liquid display comprising such a polarizing plate is often used outdoors as in a car navigation system or a cell phone, and its durability under various circumstances is required. However, the polarizing plate protective film in a conventional polarizing plate varies with time, and has a problem in that the edge of the polarizing plate transmits light, resulting in phenomenon of edge whitening.

Improvement of dimensional stability is required in another optical film employing a cellulose derivative film. For example, dimensional stability of an optical retardation film is required in view of stability of its optical properties. Recently, as a high resolution image and a color image reproduction are required in a display of a note board type personal computer or a cell phone, an optical film with high performance having an anti-reflection property or an antistatic property has been sought. Such an optical film has been developed which comprises a cellulose derivative substrate with high transmittance and a functional layer such as a metal oxide layer directly or through another layer on the substrate. However, this optical film has still a problem in that its optical properties lower due to dimensional change of the substrate.

The optical film in the invention is a functional film used in various displays such as a liquid crystal display, a plasma display, an organic EL display, a field emission display, and an electronic paper display. Examples of the optical film include a polarizing plate protective film, an optical retardation film, a reflection plate, a viewing angle increasing film, an optical compensation film, an antiglare film, an antireflection film, an illuminance increasing film, a color correction filter, a color separation film, a UV or IR absorbing film, an antistatic film, and an electrically conductive film.

SUMMARY OF THE INVENTION

An object of the invention is to provide an organic-inorganic hybrid film with lowered moisture vapor transmittance and improved dimensional stability and a manufacturing method thereof. Another object of the invention is to provide an optical film such as an optical retardation film, a polarizing plate protective film or an anti-reflection film, the optical film comprising the organic-inorganic hybrid film, and a manufacturing method thereof. Further another object of the invention is to provide an optical retardation film with reduced retardation variation and to provide a polarizing plate with excellent durability and an anti-reflection film with excellent durability.

DETAILED DESCRIPTION OF THE INVENTION

Figure 1:
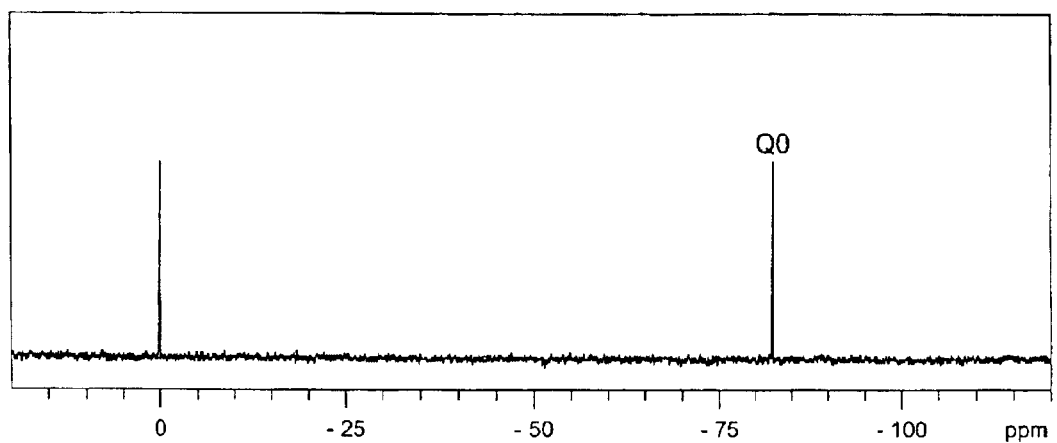
FIG. 1(a) shows 29Si NMR spectra of silicon tetraethoxide(TEOS) which is not condensed.
FIG. 1(b) shows 29Si NMR spectra of a polycondensation product formed after the TEOS has been condensed.
Figure 1:
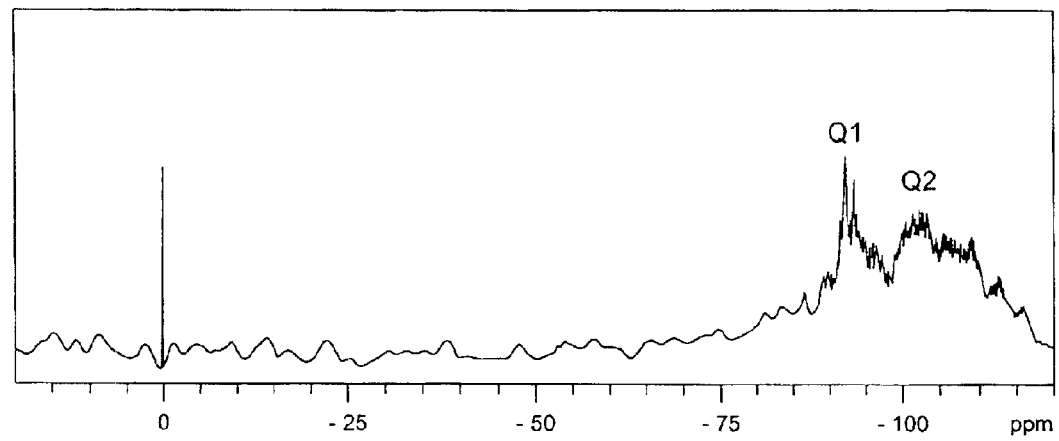

In view of the above, extensive study has been made. As a result, it has been found that the above object has been attained by organic-inorganic polymer hybridization which is a process comprising dispersing metal oxides with a size of a nanometer order in a cellulose derivative, the metal oxides being capable of interacting with, i.e., forming a hydrogen bond with, a plasticizer as well as the cellulose derivative, and the invention has been completed.

The above object of the invention has bee attained by the following constitutions:

1—1. An organic-inorganic hybrid film comprising a cellulose derivative and a polycondensation product of a condensation polymerizable reactive metal compound, wherein the film contains a plasticizer in an amount of 1 to 20% by weight.

1-2. The organic-inorganic hybrid film of item 1—1 above, wherein the plasticizer is a polyhydric alcohol ester having an aromatic ring or a cycloalkyl ring in the molecule or a glycolate having an aromatic ring or a cycloalkyl ring in the molecule.

1-3. The organic-inorganic hybrid film of item 1—1 above, wherein when the reactive metal compound is represented by $A_pM_qB_r$, and the polycondensation product by $A_pM_qO_{r/2}$ as shown in the following formula 1, the hybrid film contains the polycondensation product in an amount of 0.1 to 40% by weight, $$A_pM_qB_r \rightarrow A_pM_qO_{r/2} \qquad \text{formula 1}$$

wherein M represents a central metal atom, A represents a univalent substituent which is not hydrolyzed, B represents a substituent capable of being hydrolyzed, and p, q and r represent an integer.

1-4. The organic-inorganic hybrid film of item 1-3 above, wherein the hybrid film contains the polycondensation product in an amount of 0.5 to 5% by weight.

1-5 The organic-inorganic hybrid film of item 1—1 above, wherein the condensation polymerizable reactive metal compound is a metal alkoxide having a metal selected from the group consisting of Si, Ti, Zr and Al or a double metal alkoxide having two metals selected from the group consisting of Si, Ti, Zr and Al.

1-6. The organic-inorganic hybrid film of item 1—1 above, wherein the cellulose derivative is a cellulose ester.

1-7. The organic-inorganic hybrid film of item 1—1 above, wherein the film has a retardation in the thickness direction $R_t$ of from 70 to 300 nm, or a retardation in the plane $R_0$ of from 30 to 1000 nm, the $R_t$ and $R_0$ being represented by the following formulas 2 and 3, $$Rt=\{(nx+ny)/2-nz\} \times d \quad \text{Formula 2}$$

$$Rt=(nx-ny) \times d \quad \text{Formula 3}$$

wherein nx represents a refractive index in the plane in the direction giving maximum refractive index in the plane, ny represents a refractive index in the plane in the direction perpendicular to the direction giving the nx, nz represents a refractive index in the film thickness direction, and d represents a thickness (nm) of the film.

1-8. The organic-inorganic hybrid film of item 1-7 above, wherein the film has both a retardation in the thickness direction $R_t$ of from 70 to 300 nm and a retardation in the plane $R_0$ of from 30 to 1000 nm.

1-9. The organic-inorganic hybrid film of item 1—1 above, wherein the polycondensation product has an average particle diameter of 1 to 100 nm.

1-10. The organic-inorganic hybrid film of item 1-9 above, wherein the polycondensation product has an average particle diameter of 1 to 50 nm.

1-11. The organic-inorganic hybrid film of item 1-10 above, wherein the polycondensation product has an average particle diameter of 1 to 20 nm.

1-12. An anti-reflection film comprising the organic-inorganic hybrid film of item 1—1 above, and a metal oxide layer.

1-13. The anti-reflection film of item 1-12 above, wherein a UV cured resin layer is provided between the organic-inorganic hybrid film and the metal oxide layer.

1-14. The anti-reflection film of item 1-12 above, wherein the metal oxide layer is formed employing atmospheric pressure plasma treatment process.

1-15. The anti-reflection film of item 1-12 above, wherein the metal oxide layer is formed on the hybrid film by a process comprising the steps of supplying an electric power of from 1 to 50 W/cm$^2$ at a high frequency voltage of from 100 kHz to 150 MHz across opposed electrodes at atmospheric pressure or at approximately atmospheric pressure, inducing discharge between the opposed electrodes, exciting a reactive gas to a plasma state, and exposing the surface of the hybrid film to the reactive gas of the plasma state.

1-16. A polarizing plate comprising a polarizing film and provided on at least one side of the polarizing film, the organic-inorganic hybrid film of item 1—1 above or the anti-reflection film of item 1-12 above.

1-17. A method of manufacturing an organic-inorganic hybrid film comprising a cellulose derivative and a polycondensation product of a condensation polymerizable reactive metal compound, the film containing a plasticizer in an amount of 1 to 20% by weight, the method comprising the step of:

providing a solution containing a cellulose derivative, a polycondensation product of a condensation polymerizable reactive metal compound, a plasticizer, and a solvent; and casting the resulting solution on a support.

1-18. The method of item 1-17 above, wherein the solution contains water in an amount of 0.01 to 2.0% by weight.

2-1. An organic-inorganic hybrid film comprising as a main component a cellulose derivative and a polycondensation product derived from a reactive metal compound capable of being hydrolytically condensed, wherein the organic-inorganic hybrid film contains a plasticizer in an amount of 1 to 20% by weight.

2—2. The organic-inorganic hybrid film of item 2-1 above, wherein the plasticizer is a polyhydric alcohol ester having an aromatic ring or a cycloalkyl ring in the molecule or a glycolate having an aromatic ring or a cycloalkyl ring in the molecule.

2-3. The organic-inorganic hybrid film of item 2-1 or 2—2 above, wherein when the reactive metal compound capable of being hydrolytically condensed is represented by ApMqBr, and the polycondensation product of the reactive metal compound by ApMqOr/2, as shown in formula 1 above, the organic-inorganic hybrid film contains the polycondensation product in an amount of 0.1 to 40% by weight.

2-4. The organic-inorganic hybrid film of any one of items 2-1 through 1-3 above, wherein the reactive metal compound capable of being hydrolytically condensed is a metal alkoxide having one metal selected from Si, Ti, Zr and Al or a metal alkoxide having two metals selected from Si, Ti, Zr and Al.

2-5. The organic-inorganic hybrid film of any one of items 2-1 through 2-4, wherein the cellulose derivative is a cellulose ester.

2-6. An optical retardation film comprising the organic-inorganic hybrid film of any one of items 2-1 through 2-5, wherein the optical retardation film has a retardation in the thickness direction $R_t$ of from 70 to 300 nm, has a retardation in the plane $R_0$ of from 30 to 1000 nm, or has a retardation in the thickness direction $R_t$ of from 70 to 300 nm and a retardation in the plane $R_0$ of from 30 to 1000 nm, the $R_t$ and $R_0$ being represented by formulas 2 and 3 above.

2-7. An polarizing plate protective film comprising the organic-inorganic hybrid film of any one of items 2-1 through 2-5 above.

2-8. An anti-reflection film comprising the organic-inorganic hybrid film of any one of items 2-1 through 2-5 above, and a metal oxide layer.

2-9. The anti-reflection film of item 8 above, wherein a UV cured resin layer is provided between the organic-inorganic hybrid film and the metal oxide layer.

2-10. The anti-reflection film of item 2-8 or 2-9 above, wherein the metal oxide is formed on the hybrid film by a process comprising the steps of supplying an electric power of from 1 to 50 W/cm$^2$ at a high frequency voltage of from 100 kHz to 150 MHz across opposed electrodes at atmospheric pressure or at approximately atmospheric pressure, inducing discharge between the opposed electrodes, exciting a reactive gas to a plasma state, and exposing the surface of the hybrid film to the reactive gas of the plasma state.

2-11. A polarizing plate comprising at least one selected from the polarizing plate protective film of item 2-7 above and the antireflection film of any one of items 2-8 through 2-10 above.

2-12. A method of manufacturing an organic-inorganic hybrid film of any one of items 2-1 through 2-5 above according to a solution cast film manufacturing method.

2-13. The method of item 2-12 above, wherein the solution cast film manufacturing method is carried out employing a solution containing water in an amount of 0.01 to 2.0% by weight.

The present invention will be detailed below.

Organic-inorganic polymer hybridization (also referred to as organic-inorganic polymer composite method or a sol-gel method, but in the invention, referred to as organic-inorganic polymer hybridization) means a process of combining an organic polymer with an inorganic compound to prepare a material having both properties of the organic polymer and those of the inorganic compound. Since the organic polymer and the inorganic compound are generally immiscible with each other, it is difficult to obtain a useful material by simply mixing them. In recent years, a method has been developed in which an inorganic compound is prepared from a liquid such as a metal alkoxide, and it has been possible to prepare a mixture of an organic compound and an inorganic compound each having a size of a nanometer order of not longer than a visible wavelength (not more than about 750 nm) from a solution process. Thus, a useful material has been obtained which is optically transparent.

Extensive study has been made, and it has been found that a substrate film, prepared by mixing a cellulose derivative as an organic polymer with a metal oxide as an inorganic polymer under specific conditions, improves dimensional stability while keeping transparency and optical properties of the cellulose derivative. Thus, a substrate film has been obtained which solves the problems described above. Further, unexpected results have been obtained that the substrate film obtained by hybridization of a metal oxide with an organic polymer, even when the film contains a plasticizer, lowers moisture vapor transmittance, and when it is used as an optical retardation film, increases retardation per unit thickness of the film.

<Organic Polymer>

In the invention, a cellulose derivative with a low birefringence and a positive wavelength diversion is used as an organic polymer for an organic-inorganic hybrid film, which is a preferred organic material for a film of a liquid crystal display.

A polymer with a positive wavelength diversion means a polymer with a value obtained by dividing retardation in plane at a wavelength 600 nm R (600) by retardation in plane at a wavelength 450 nm R (450) is greater than 1. Herein, retardation in plane at a wavelength 600 nm R (600) and retardation in plane at a wavelength 450 nm R (450) of the polymer are those of a film with a with a thickness of 100 μm formed by dissolving the polymer in a solvent (for example, acetone, methyl acetate, tetrahydrofuran, 1,3-dioxolan, methylene chloride or a mixture thereof) to obtain a polymer solution, casting the solution on a glass plate, and drying.

The substrate film with a positive wavelength diversion can compensate polarization of light over the entire wavelength regions of visible light, can prevent color shift in a crystal liquid panel employing a displaying method employing birefringence, and can provide a good contrast image in an organic EL display element.

As the cellulose derivative used in the invention, there are cellulose ethers such as methyl cellulose, ethyl cellulose, hydroxyethyl cellulose, hydroxypropyl cellulose, and cyanoethyl cellulose, and cellulose esters such as triacetyl cellulose (TAC), diacetyl cellulose (DAC), cellulose acetate propionate (CAP), cellulose acetate butyrate (CAB), cellulose acetate phthalate, cellulose acetate trimellitate and cellulose nitrate. The cellulose esters are preferred.

Raw materials for the cellulose derivative used in the invention are not specifically limited, and include cotton lint, tree pulp and kenaf. The cellulose derivatives derived from these raw materials may be used in combination in an arbitrary amount ratio. It is preferred that not less than 50% by weight of cotton lint are used as a raw material of the cellulose derivative.

A high molecular weight of cellulose ester provides a cellulose ester film with a large coefficient of elasticity, but too high molecular weight of cellulose ester lowers productivity of cellulose ester film due to too high viscosity of a cellulose ester solution. The number average molecular weight (Mn) of the cellulose ester is preferably 70,000 to 200,000, and more preferably 100,000 to 200,000. The cellulose ester used in the invention has a Mw/Mn ratio of preferably less than 3.0, and more preferably 1.4 to 2.3. Mw represents a weight average molecular weight.

The number average molecular weight or molecular weight distribution of cellulose ester can be determined employing high speed liquid chromatography. The number average molecular weight (Mn) and the weight average molecular weight (Mw) are measured employing high speed liquid chromatography, and the Mw/Mn ratio is determined.

The measurement conditions are shown hereunder.

Solvent: methylene chloride
Column: Three columns of Shodex K806, K805, and K803G (manufactured by Showa Denko Co., Ltd.) were employed in series.
Column temperature: 25° C.
Sample concentration: 0.1% by weight
Detector: RI Model 504 (manufactured by GL Science Co., Ltd.)
Pump: L6000 (manufactured by Hitachi, Ltd.)
Flow rate: 1.0 ml/minute
Calibration curve: Standard Polystyrene STK standard polystyrenes (manufactured by TOSOH Corp., a calibration curve was drawn employing 13 kinds of polystyrenes having a molecular weight of from 1,000,000 to 500. Herein, 13 kinds of polystyrenes having a molecular weight divided equally among 13 are preferably used.

The degree of acyl substitution of cellulose ester is from 2.3 to 2.9, and preferably from 2.6 to 2.9. The degree of acyl substitution of cellulose ester is determined according to ASTM-D817-96.

The cellulose derivative content of the organic-inorganic hybrid film is preferably from 50 to 98.9% by weight, more preferably from 70 to 98.5% by weight, and still more preferably from 80 to 90% by weight.

<Polycondensation Product of Condensation Polymerizable Reactive Metal Compound>

The polycondensation product of a condensation polymerizable reactive metal compound (hereinafter also referred to as the polycondensation product in the invention) constituting the organic-inorganic hybrid film of the invention will be explained below.

In the invention, the "metal" in the condensation polymerizable reactive metal compound means metals as described on page 71 of Saito Kazuo et al., "Shukihyo no Kagaku", published by Iwanami Shoten, that is, metals including a semi-metal.

As the reactive metal compound (hereinafter referred to also as the condensation-polymerizable reactive metal compound in the invention) used in the invention, which is capable of being condensation-polymerized, there is mentioned, for example, a metal alkoxide, a metal diketonate, a metal alkyl acetoacetate, a metal isocyanate or a reactive metal halide. The metal in these compounds is preferably one selected from the group consisting of silicon, zirconium, titanium and aluminum, and is especially preferably silicon.

When the reactive metal compound in the invention represented by $A_pM_qB_r$ is reacted, it ideally completes its reaction as shown in the following formula (1) to produce a metal oxide, $$A_pM_qB_r \rightarrow A_pM_qO_{r/2} \qquad \text{formula 1}$$

wherein M represents a central metal atom, q represents an atom number of M, A represents a first substituent which is not hydrolyzed, p represents a first substituent number, B represents a second substituent capable of being hydrolyzed, and r represents a second substituent number.

In the invention, the content (by weight) of the polycondensation product in the invention in the organic-inorganic hybrid film is shown in terms of the content of oxide of the metal contained in the polycondensation product based on the cellulose derivative. The metal oxide content can be obtained as the ash content after the organic-inorganic hybrid film has been burned. When components (for example, P) other than the metal oxide are contained in the ash, the metal oxide content in the ash can be determined according to a well-know method.

The content of the polycondensation product in the invention in the organic-inorganic hybrid film is preferably from 0.1 to 40% by weight, more preferably from 0.5 to 20% by weight, and still more preferably from 0.5 to 5% by weight. The above range of the inorganic compound content is preferred in improvement of physical properties or flexibility of the organic-inorganic hybrid film.

The average particle diameter of the polycondensation product in the organic-inorganic hybrid film of the invention can be determined according to transmission electron microscope observation or X-ray small angle scattering. The X-ray small angle scattering is preferred. The X-ray small angle scattering can be referred to "X Sen Kaiseki Handbook", Third edition (2000), published by Rigaku Denki Co., Ltd. When regions having different electron density are present in a sample, scattering is observed in a direction of incident X ray. This scattering is observed in an angle of from 0 to 5°, which is called small angle scattering. The average particle diameter of the polycondensation product is determined from this scattering spectra employing a Guinier plot method or a Fankuchen method. For example, the average particle diameter of the polycondensation product is determined employing X ray small angle scattering under the following conditions.

Apparatus used: an X ray small and large angle diffractometer RINT 2500/PHOSPHORESCENT COMPOUND, produced by Rigaku Denki Co., Ltd.
Target: Copper
Output power: 40 kV–200 mA
First slit: 0.04 mm
Second slit: 0.03 mm
Acceptance slit: 0.1 mm
Scattering slit: 0.2 mm
Measurement: 2θ FT scanning method
Measurement range: 0.1 to 6°
Sampling: 0.04°
Time: 30 seconds The resulting spectra obtained by the above measurement is corrected regarding air scattering and slits, and analysis of the particle diameter distribution is carried out employing a Guinier plot method. The radius of inertia is regarded as that of a sphere.

The polycondensation product in the invention in the organic-inorganic hybrid film has an average particle diameter of preferably 1 to 200 nm, more preferably 1 to 100 nm, still more preferably 1 to 50 nm, and most preferably 1 to 20 nm.

The polycondensation product added in the invention is difficult to form its aggregates and stably exists as smaller particles, as compared with metal oxide particles, which are dispersed in a cellulose ester solution and added as in a conventional method.

All the substituents in the reactive metal compound in the invention are preferably substituents capable of being hydrolyzed wherein p=0 in the formula above. A metal compound having one, two or three substituents which are not hydrolyzed per one metal atom may be contained in the organic-inorganic hybrid film in that moisture vapor transmittance is reduced. The content of such a metal compound having substituents which are not hydrolyzed is preferably not more than 50 mol % based on the total metal compound. Two or more kinds of metal alkoxides may be added within the content range described above.

The substituents which are not hydrolyzed are preferably a substituted or unsubstituted alkyl group and a substituted or unsubstituted aryl group. The substituents of the alkyl group and the aryl group include an alkyl group (for example, a methyl group, an ethyl group, etc.); a cycloalkyl group (for example, a cyclopentyl group, a cyclohexyl group, etc.); an aralkyl group (for example, a benzyl group, a phenetyl group, etc.); an aryl group (for example, a phenyl group, a naphthyl group, etc.); a heterocyclic group (for example, a furanyl group, a thiophenyl group, a pyridyl group, etc.); an alkoxy group (for example, a methoxy group, an ethoxy group, etc.); an aryloxy group (for example, a phenoxy group, etc.); an acyl group; a halogen atom; a cyano group; an amino group; an alkylthio group; a glycidyl group; a glycidoxy group; a vinyl group; a fluorine-containing alkyl group; and a fluorine-containing aryl group.

Examples of the reactive metal compounds used in the invention, which is capable of being condensation-polymerized, include silicon compounds such as tetramethoxysilane, tetraethoxysilane, tetraisopropoxysilane, tetra-n-butoxysilane, tetra-t-butoxysilane, tetrakis(methoxyethoxy)silane, tetrakis (methoxypropoxy)-silane, tetrachlorosilane, and tetraisocyanatosilane.

Examples of silicon compounds having a substituent which is not hydrolyzed include dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyldibutoxysilane, diphenyldimethoxysilane, diphenyldiethoxysilane, diphenyldiisopropoxysilane, diphenyldibutoxysilane, 3-glycidoxypropylmethyl-dimethoxysilane, dichlorodimethylsilane, dichlorodiethylsilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, phenyltrimethoxysilane, phenyltriethoxysilane, phenyltriisopropoxysilane, phenyltributoxysilane, vinyltrimethoxysilane, vinyltriethoxysilane, vinyltriisopropoxysilane, vinyltributoxysilane, 3-glycidoxypropyltrimethoxysilane, 3-aminopropyltrimethoxysilane, 2-(3,4-epoxycyclohexyl) ethyltrimethoxysilane, 3-chloropropyltrimethoxysilane, 3-mercaptopropyltrimethoxysilane, (3-acryloxypropyl) trimethoxysilane, acetoxytrietoxysilane, (heptadecafluoro-1,1,2,2-tetrahydrodecyltrimethoxysilane, (3,3,3-trifluoropropyl)trimethoxysilane, methyltrichlorosilane, ethyltrichlorosilane, phenyltrichlorosilane, (3,3,3-trifluoropropyl)triethoxysilane, pentafluorophenylpropyl-trimethoxysilane, (heptadecafluoro-1,1,2,2-tetrahydrodecyl) triethoxysilane, (3,3,3-trifluoropropyl)trichlorosilane, pentafluorophenylpropyl-trichlorosilane, (heptadecafluoro-1,1,2,2-tetrahydrodecyl)trichlorosilane, methyltricyanatosilane, phenyltricyanatosilane, and vinyltricyanatosilane.

The silicon compound may be a silicon compound in which several of each of the compounds above are condensed, for example, Silicate 40, Silicate 45, Silicate 48, or M Silicate 51, each produced by Tama Kagaku Co., Ltd.

Examples of a titanium compound include titanium methoxide, titanium ethoxide, titanium isopropoxide, titanium-n-butoxide, tetrachlorotitanium, titanium diisopropoxide(bis-2,4-pentanedionate), titanium diisopropoxide(bis-2,4-ethylacetoacetate), titanium di-n-butoxide(bis-2,4-pentanedionate), titanium acetylacetonate, titanium lactate, titanium triethanolaminate, and a butyltitanium dimer.

Examples of a zirconium compound include zirconium n-propoxide, zirconium-n-butoxide, zirconium tri-n-butoxide acetylacetonate, zirconium tri-n-butoxide bisacetylacetonate, zirconium acetylacetonate, and zirconium acetate.

Examples of an aluminum compound include aluminum ethoxide, aluminum isopropoxide, aluminum-n-butoxide, aluminum-s-butoxide, aluminum-di-s-butoxide acetylacetonate, aluminum-t-butoxide, alumatrane, aluminum phenoxide, aluminum acetylacetonate, and aluminum ethylacetylacetonate.

Examples of another metal compound include barium isopropoxide, calcium ethoxide, copper ethoxide, magnesium ethoxide, manganese methoxide, strontium isopropoxide, tin ethoxide, zinc methoxyethoxide, trimethoxyborane, triethoxyborane, antimony ethoxide, arsenic triethoxide, bismuth t-pentoxide, chromium isopropoxide, erbium methoxyethoxide, gallium ethoxide, indium methoxyethoxide, iron ethoxide, lanthanum isopropoxide, neodymium methoxyethoxide, praseodymium methoxyethoxide, samarium isopropoxide, vanadium triisobutoxide, yttrium isopropoxide, tetramethoxygermane, tetraethoxygermane, tetraisopropoxygermane, tetra-n-butoxygermane, cerium t-butoxide, hafnium ethoxide, hafnium-n-butoxide, tellurium ethoxide, molybdenum ethoxide, niobium ethoxide, niobium-n-butoxide, tantalum methoxide, tantalum ethoxide, tantalum-n-butoxide, tungsten (V) ethoxide, tungsten (VI) ethoxide, and tungsten (VI) phenoxide.

The condensation-polymerizable reactive metal compound used in the invention may be a metal compound called a double metal alkoxide which has two metal atoms in the molecule. Examples of the double metal alkoxide include aluminum copper alkoxide, aluminum titanium alkoxide, aluminum yttrium alkoxide, aluminum zirconium alkoxide, barium titanium alkoxide, barium yttrium alkoxide, barium zirconium alkoxide, indium tin alkoxide, lithium nickel alkoxide, lithium niobium alkoxide, lithium tantalum alkoxide, magnesium aluminum alkoxide, magnesium titanium alkoxide, magnesium zirconium alkoxide, strontium titanium alkoxide, and strontium zirconium alkoxide. The double metal alkoxide is preferably one having a metal selected from the group consisting of silicon, aluminum, titanium and zirconium.

The organic-inorganic hybrid film of the invention is manufactured by a method comprising the steps of providing a solution (also referred to as a dope) containing a cellulose derivative, a polycondensation product of a condensation polymerizable reactive metal compound, a plasticizer, and a solvent, and casting the resulting solution on a support.

Condensation polymerization of the reactive metal compound may be carried out in a solution (dope) containing the reactive metal compound or in a web formed on a support after casting the solution on the support, and is preferably carried out in the solution. The condensation polymerization does not need to be completed, but is preferably completed. The process of condensation polymerization of the reactive metal compound can be observed according to NMR. When silicon alkoxide is employed as the reactive metal compound, and hydrolyzed, alkoxide SiOR of the silicon alkoxide, in which R is alkyl, is changed to SiOH, silanol, and intermolecular condensation between the silanols occurs to produce a silicon polymer. The peaks corresponding to the number of SiOR's reacted in the reactive metal compound appear in 29Si NMR spectra. In the 29Si NMR spectra of silicon tetralkoxide $Si(OR)_4$ having four alkoxides, peak called Q0 appears corresponding to one in which no alkoxide is condensed, although hydrolyzed to hydroxide, peak Q1 appears corresponding to one in which only one alkoxide is condensed with another one, and peak Q2 appears corresponding to one in which two alkoxides are condensed with another two.

FIGS. 1(a) and 1(b) show 29Si NMR spectra of silicon tetraethoxide (TEOS) $Si(OC_2H_5)_4$ which is not condensed, and a polycondensation product formed after the TEOS has been condensed, respectively. The ordinate shows relative rate of signals, and the abscissa shows frequency. Intervals between the frequency vary depending on magnetic field intensity applied, and the abscissa is generally expressed in ppm which is a ratio of the difference in resonance frequency between sample and standard sample TMS to frequency of a measuring device used. This applies to FIGS. 1(a) and 1(b). When $Si(OC_2H_5)_4$ is not condensed, peak Q0 ascribed to its Si appears, while when $Si(OC_2H_5)_4$ is condensed, peak Q0 disappears, and various peaks ascribed to Q1 and Q2 appear. It is preferred that condensation reaction of the reactive metal compound is observed according to NMR.

<Solvent>

The cellulose derivative and the condensation polymerizable reactive metal compound in the invention are dissolved in a solvent to obtain a dope. The solvent is preferably volatile since the solvent is necessary to be evaporated after casting or extruding the dope on a support to form a film on the support. Further, the solvent is a solvent, which does not react with the metal compound or catalyst used and which does not dissolve a support on which a dope containing the solvent is cast or extruded. The solvent may be used as a mixture of two or more kinds thereof. The organic polymer in the invention and the reactive metal compound in the invention may be dissolved in a different solvent, separately, and then the resulting solutions may be mixed.

In the invention, an organic solvent capable of dissolving the cellulose derivative described above is referred to as a good solvent, and an organic solvent used in a large amount to dissolve the cellulose derivative is referred to as a main organic solvent.

Examples of the good solvent include ketones such as acetone, methyl ethyl ketone, cyclopentanone, and cyclohexanone; ethers such as tetrahydrofuran (THF), 1,4-dioxane, 1,3-dioxolane, and 1,2-dimethoxyethane; esters such as methyl formate, ethyl formate, methyl acetate, ethyl acetate, amyl acetate, and γ-butyrolactone; methylcellosolve; dimethylimidazolinone; dimethylformamide; dimethylacetoamide; acetonitrile; dimethylsulfoxide; sulfolane; nitroethane; and methylene chloride. 1,3-dioxolane, THF, acetone, methyl ethyl ketone, methyl acetate, and methyl acetoacetate are preferred.

The dope used in the invention preferably contains an alcohol having 1 to 4 carbon atoms in an amount of not less than 1 to 40% by weight, in addition to the solvents described above. When a dope employing such an alcohol is cast on a metal support, and the solvent is evaporated to form a web (referred to a dope film formed on a support after the dope is cast on the support), the residual alcohol content of the web increases during solvent evaporation, and the residual alcohol as a gelling agent results in gelation of the web, whereby the web formed are easily peeled from the support. An organic solvent containing such an alcohol in a small amount increases solubility of a cellulose derivative in an organic solvent containing no chlorine atom, and restrains gelation or separation of the reactive metal compound or viscosity increase of the dope.

The alcohols having 1 to 4 carbon atoms include methanol, ethanol, n-propanol, iso-propanol, n-butanol, sec-butanol, tert-butanol, and propylene glycol monomethyl ether. Of these alcohol solvents, alcohol is preferred, which is less harmful, provides good dope stability, and has a relatively low boiling point and good drying property. These alcohol solvents alone cannot dissolve the cellulose derivative and therefore belong to poor solvents.

<Hydrolysis Catalyst>

On preparing the organic-inorganic hybrid film of the invention, water and a catalyst may be added to the dope in order to accelerate hydrolysis of the condensation polymerizable reactive metal compound and promote condensation reaction.

However, water is preferably added to the dope in an amount of from 0.01 to 2.0% by weight based on the dope weight, in view of haze or flatness of film, and productivity such as film manufacturing speed or solvent recycling. When water is added to the reactive metal compound capable of being condensation-polymerized, which is hydrophobic, a hydrophilic organic solvent such as methanol, ethanol or acetonitrile is preferably added so that water is miscible with the reactive metal compound. When the cellulose derivative and the reactive metal compound capable of being condensation-polymerized are mixed to prepare a dope, a good solvent for the cellulose derivative is added to the dope so that the cellulose derivative does not sediment in the dope.

Examples of the catalyst for accelerating hydrolysis of the metal compound include an inorganic acid such as hydrochloric acid, sulfuric acid, or nitric acid, and an organic acid such as acetic acid, trifluoroacetic acid, levulinic acid, citric acid, p-toluene sulfonic acid, or methane sulfonic acid. After the sol•gel reaction is completed in the presence of an acid catalyst, the resulting reaction mixture may be neutralized with a base. When the reaction mixture is neutralized with a base, the alkali metal content of the resulting mixture is preferably zero to less than 5000 ppm by weight based on the total solid content of the mixture. The catalyst may be used together with lewis acid, for example, a salt of acetic acid, another organic acid or phosphoric acid with a metal such germanium, titanium, aluminum, antimony or tin, or a halide of such metal.

As the catalyst, bases can be used instead of the acid catalysts. Examples of the bases include amines, for example, monoethanolamine, diethanolamine, triethanolamine, diethylamine, triethylamine, etc.; bicyclic amines, for example, DBU (diazabicycloundecene-1), DBN (diazabicyclononene), etc.; ammonia; phosphine; an alkali metal alkoxide; ammonium hydroxide; tetramethylammonium hydroxide; and benzyltrimethylammonium hydroxide.

The addition amount of these acid or base catalyst is not specifically limited, but is preferably from 1.0 to 20% by weight based on the weight of the reactive metal compound capable of being condensation-polymerized. Further, processing by the acids or bases can be repeated plural times. The catalyst after hydrolysis can be neutralized, removed under reduced pressure if they are volatile, or removed by washing with water.

Of the solvents satisfying the conditions described above and dissolving the cellulose derivative as a preferred organic polymer, the preferred are a mixture solvent of methylene chloride and ethyl alcohol (having a methylene chloride to ethyl alcohol ratio of from 95:5 to 80:20), and a mixture solvent of methyl acetate and ethyl alcohol (having a methyl acetate to ethyl alcohol ratio of from 60:40 to 95:5).

<Additives>

The organic-inorganic hybrid film of the invention may contain a plasticizer giving processability, flexibility or moisture proof to the film, a UV absorbent giving a UV absorption property to the film, an anti-oxidizing agent preventing deterioration of the film, particles (matting agents) giving slidability to the film, or a retardation adjusting agent adjusting retardation of the film.

<Plasticizer>

A plasticizer is not specifically limited, but a plasticizer is preferred which has a functional group which can interact with, for example form a hydrogen bond with a cellulose derivative or a condensation polymer of a hydrolytic condensation polymerizable reactive metal compound, since no haze is produced, and neither bleeding-out nor volatilization of the plasticizer from the film occurs.

Examples of the functional group include a hydroxyl group, an ether group, a carbonyl group, an ester group, a carboxyl group, an amino group, an imino group, an amido group, an imido group, a cyano group, a nitro group, a sulfonyl group, a sulfonic acid group, a phosphonyl group, and a phosphonic acid group. Preferred functional group is a carbonyl group, an ester group, or a phosphonyl group.

Such plasticizers are preferably a phosphate plasticizer, a phthalate plasticizer, a trimellitate plasticizer, a pyromellitate plasticizer, a polyhydric alcohol ester, a glycolate plasticizer, a citrate plasticizer, a fatty acid ester plasticizer, a carboxylic acid ester plasticizer, and a polyester plasticizer, and especially preferably a polyhydric alcohol ester, and a glycolate plasticizer.

The polyhydric alcohol ester herein referred to implies an ester of an aliphatic polyhydric alcohol and a monocarboxylic acid. In the invention, the polyhydric alcohol ester preferably has a cycloalkyl ring in the molecule.

The polyhydric alcohol used in the invention is represented by the following formula (1):

$$R_1-(OH)n \qquad \text{Formula (1)}$$

wherein $R_1$ represents an n-valent organic group, and n represents an integer of not less than 2.

Preferred examples of the polyhydric alcohol include those described below, but the invention is not limited thereto. Preferred examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,3,4-butanetriol, 1,5-pentanediol, 1,6-hexanediol, hexanetriol, galactitol, mannitol, 3-methylpentane-1,3,5-triol, pinacol, sorbitol, trimethylolpropane, trimetylolethane, and xylitol. Triethylene glycol, tetraethylene glycol, dipropylene glycol, tripropylene glycol, sorbitol, trimethylolpropane, and xylitol are especially preferable.

The monocarboxylic acids used for the preparation of the polyhydric alcohol ester in the invention are not specifically limited. The monocarboxylic acids include an aliphatic monocarboxylic acid, an alicyclic monocarboxylic acid, and an aromatic monocarboxylic acid, and an alicyclic monocarboxylic acid and an aromatic monocarboxylic acid are preferable in improving water vapor transmission rate and a retention property.

Preferred examples of the monocarboxylic acid include the compounds described later, but the present invention is not limited thereto.

The aliphatic monocarboxylic acid is a straight chained or branched fatty acid having a carbon atom number of preferably from 1 to 32, more preferably from 1 to 20, and most preferably from 1 to 10. Acetic acid is preferable in providing increased compatibility with cellulose ester, and a combined use of acetic acid and another monocarboxylic acid is more preferable.

Preferred examples of the aliphatic monocarboxylic acid include a saturated fatty acid such as acetic acid, propionic acid, butyric acid, valeric acid, caproic acid, enanthic acid, pelargonic acid, capric acid, 2-ethyl-hexane carboxylic acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, heptacosanoic acid, montanic acid, melissic acid or lacceric acid; and an unsaturated fatty acid such as undecylenic acid, oleic acid, sorbic acid, linolic acid, linolenic acid or arachidonic acid. These include those having a substituent.

Preferred examples of the alicyclic monocatboxylic acid include cyclopentane carboxylic acid, cyclohexane carboxylic acid, cyclooctane carboxylic acid, and their derivatives.

Preferred examples of the aromatic monocarboxylic acid include benzoic acid, an alkyl-substituted benzoic acid such as toluic acid, an aromatic monocarboxylic acid having two or more benzene rings such as biphenyl carboxylic acid, naphthalene carboxylic acid, or tetrarin carboxylic acid and their derivatives. Benzoic acid is especially preferable.

The molecular weight of the polyhydric alcohol ester used in the invention is not specifically limited, but is preferably from 300 to 1500, and more preferably from 350 to 750. The polyhydric alcohol ester with higher molecular weight is preferable in low volatility, and the polyhydric alcohol ester with lower molecular weight is preferable in water vapor transmission rate and its compatibility with cellulose ester.

The monocarboxylic acid for the preparation of the polyhydric alcohol ester in the invention may be used singly or as a mixture or two or more kinds thereof. All the hydroxy groups of the polyhydric alcohol may be esterified or a part of the hydroxy groups of the polyhydric alcohol may be esterified to remain a free hydroxyl group.

Examples of the polyhydric alcohol ester in the invention will be exemplified below.

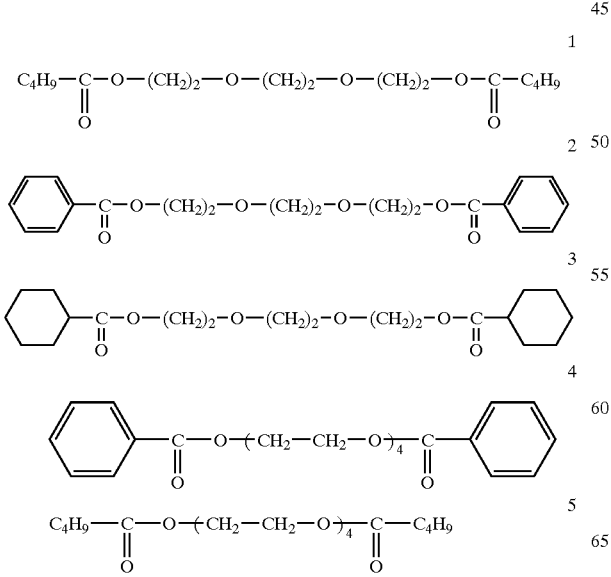

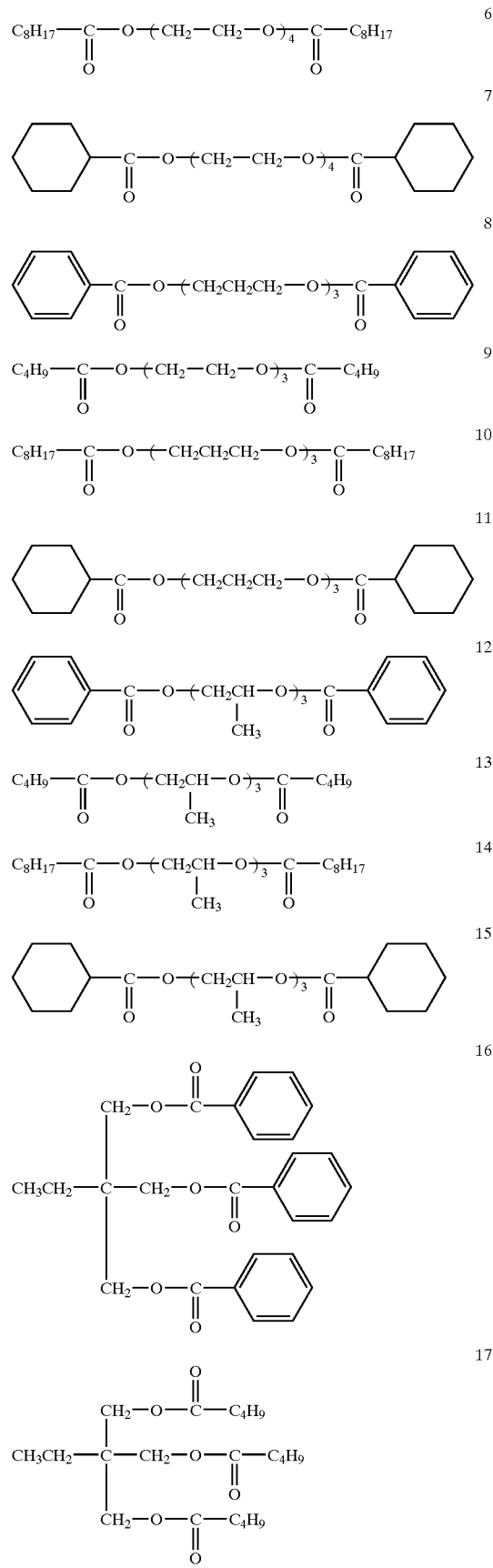

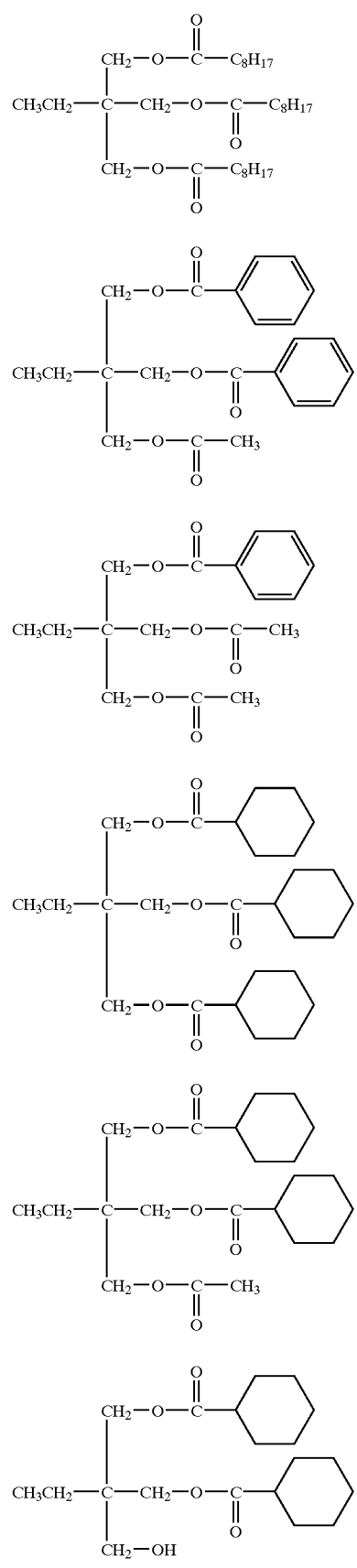
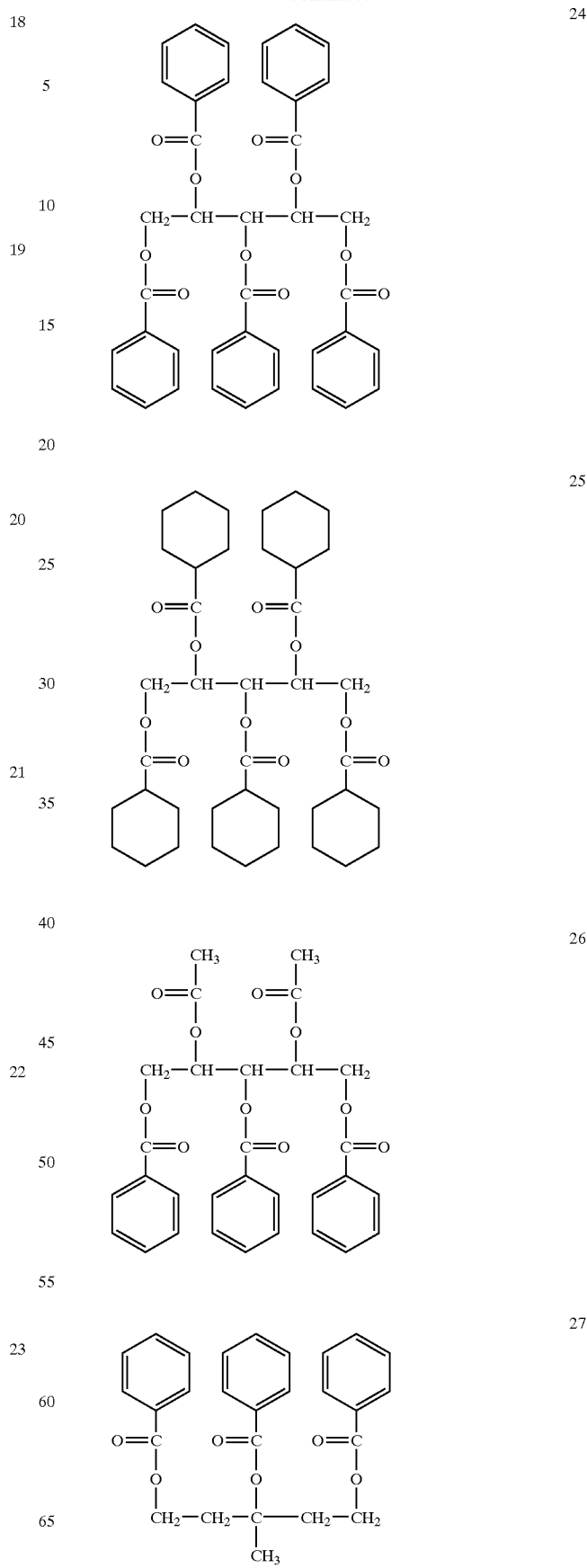

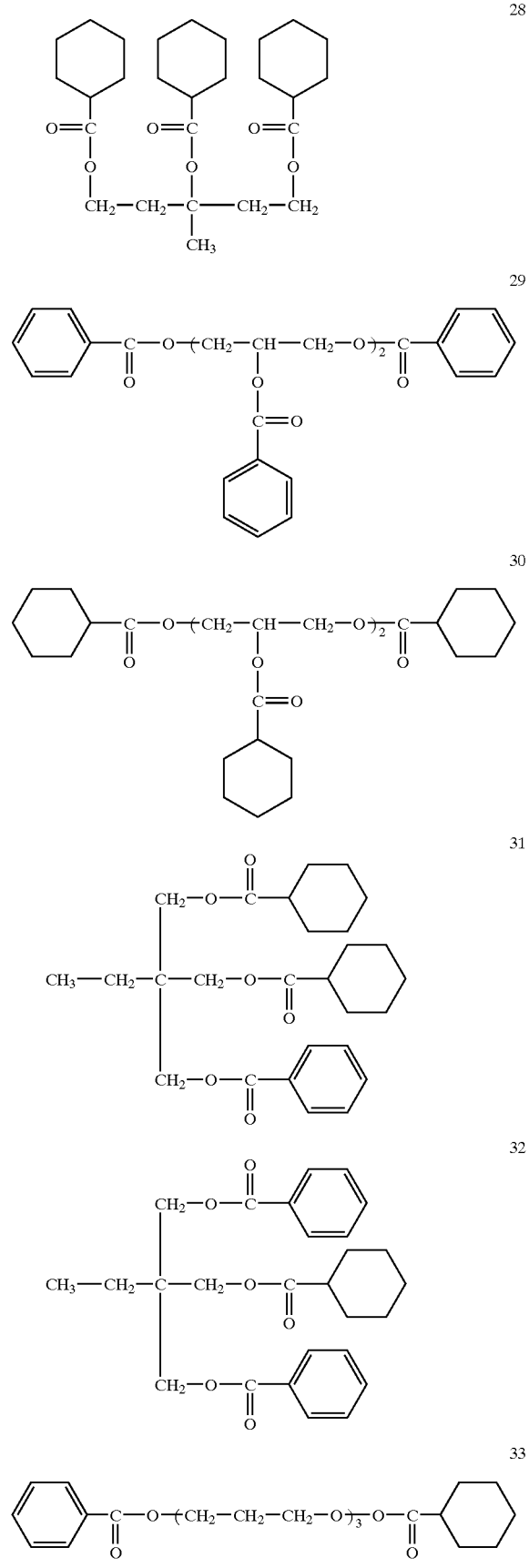

A glycolate plasticizer is not specifically limited, but is preferably a glycolate plasticizer having an aromatic ring or a cycloalkyl ring in the molecule. Preferred examples of the glycolate plasticizer include butylphthalylbutyl glycolate, ethylphthalylethyl glycolate, or methylphthalylethyl glycolate.

Examples of the phosphate plasticizer include triphenyl phosphate, tricresyl phosphate, cresyldiphenyl phosphate, octyldiphenyl phosphate, diphenylbiphenyl phosphate, trioctyl phosphate, or tributyl phosphate. Examples of the phthalate plasticizer include diethyl phthalate, dimethoxyethyl phthalate, dimethyl phthalate, dioctyl phthalate, dibutyl phthalate, di-2-ethylhexyl phthalate, and dicyclohexyl phthalate.

These plasticizers may be used singly or as a mixture of two or more kinds thereof. The plasticizer content of the hybrid film in the invention is from 1 to 20% by weight, preferably from 6 to 16% by weight, and more preferably from 8 to 13% by weight, based on the cellulose derivative. The plasticizer content less than 1% by weight lowers moisture vapor transmittance, and the plasticizer content exceeding 20% by weight causes bleeding-out of the plasticizer, resulting in deterioration of physical properties of hybrid film.

<UV Absorbent>

UV absorption function is preferably given to various optical films such as a polarizing plate protective film, an optical retardation film, and an optical compensation film in preventing deterioration of crystal liquid. Such a UV absorption function is preferably given by incorporating a UV absorbent in a cellulose derivative or providing a layer with UV absorption function a film comprised of cellulose derivative.

The UV absorbent is preferably a UV absorbent which has excellent absorption of ultraviolet light having a wavelength of 370 nm or less, and has reduced absorption of visible light having a wavelength of 400 nm or more. The UV absorbents preferably used in the invention include a triazine compound, an oxybenzophenone compound, a benzotriazole compound, a salicylic acid ester compound, a benzophenone compound, a cyanoacrylate compound, a nickel complex compound, and a triazine compound, but they are not limited thereto. The polymeric UV absorbents disclosed in Japanese Patent O.P.I. Publication No. 6-148430 are also especially preferably used.

Examples of the UV absorbent useful for the invention include 2-(2'-hydroxy-5'-methylphenyl)-benzotriazole, 2-(2'-hydroxy-3',5'-di-tert-butylphenyl)-benzotriazole, 2-(2'-hydroxy-3'-tert-butyl-5'-methylphenyl)-benzotriazole, 2-(2'-hydroxy-3',5'-di-t-butylphenyl)-5-chlorobenzotriazole, 2-(2'-hydroxy-3'-(3",4",5",6"-tetrahydrophthalimidomethyl)-5'-methylphenyl)-benzotriazole, 2,2-methylenebis(4-(1,1,3,3-tetramethylbutyl)-6-(2H-benzotriazole-2-yl)phenol), 2-(2'-hydroxy-3'-t-butyl-5'-methylphenyl)-5-chlorobenzotriazole, 2-(2H-benzotriazole-2-yl)-6-(straight-chained or branched dodecyl)-4-methylphenol(TINUVIN 171), a mixture (TINUVIN 109) of octyl-3-[3-t-butyl-4-hydroxy-5-(chloro-2H-benzotriazole-2-yl)phenyl] propionate and 2-ethylhexyl-3-[3-tert-butyl-4-hydroxy-5-(5-chloro-2H-benzotriazole-2-yl)phenyl] propionate, and 2-(2H-benzotriazole-2-yl)-4,6-bis(1-methyl-1-phenylethyl)phenol (TINUVIN 234), but are not limited thereto. TINUVIN 109, TINUVIN 171, and TINUVIN 326 (each produced by Ciba Specialty Co., Ltd.), which are commercially available, are preferably used.

Examples of the benzophenone compound include 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane), but are not limited thereto.

The UV absorbent used in the organic-inorganic hybrid film in the invention is preferably a UV absorbent with a distribution coefficient of not less than 9.2 and preferably of not less than 10.1 disclosed in Japanese Patent O.P.I. Publication No. 2000-187825, since it minimizes contamination in a plasma treatment process described later and improves coatability of various coating layers.

Polymeric UV absorbents (or UV absorption polymers) disclosed in Japanese Patent O.P.I. Publication Nos. 6-148430 and 2002-47357 are preferably used. Polymeric UV absorbents represented by formula (1) or (2) disclosed in Japanese Patent O.P.I. Publication No. 6-148430 and Polymeric UV absorbents represented by formula (3), (6) or (7) disclosed in Japanese Patent O.P.I. Publication No. 2002-47357 are especially preferred.

The content of the compounds is preferably from 0.1 to 5.0% by weight, and more preferably from 0.5 to 1.5% by weight, based on the cellulose derivative.

<Anti-Oxidizing Agent>

The anti-oxidizing agent is also called a deterioration-preventing agent. When a liquid crystal display employing the organic-inorganic hybrid film is stored at high temperature and at high humidity, the organic-inorganic hybrid film may deteriorate. The anti-oxidizing agent is preferably contained in the organic-inorganic hybrid film, since it retards or prevents decomposition of the organic-inorganic hybrid film due to halogen in the residual solvent used or phosphoric acid in the phosphate plasticizer used.

Hindered phenol compounds are preferably used as an anti-oxidizing agent. Examples of the hindered phenol compounds include 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thiodiethylenebis[3-(3,5-di-t-butyl-4-hydroxyphenyl) propionate], octadecyl-3-(3,5-di-t-butyl-4-hydroxyphenyl) propionate, 1,3,5-trimethyl-2,4,6-tris(3,5-di-t-butyl-4-hydroxybenzyl)benzene, and tris-(3,5-di-t-butyl-4-hydroxybenzyl)-isocyanurate. Of these, 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate] are especially preferable. A metal-inactivating hydrazine compound such as N,N'-bis[3-(3,5-di-t-butyl-4-hydroxyphenyl) propionyl]-hydrazine or a phosphor-containing stabilizer such as (2,4-di-t-butylphenyl)phosphite can be used in combination.

The content of these compounds in the cellulose derivative is preferably 1 ppm to 1.0% by weight, and more preferably 10 to 1000 ppm by weight based on the cellulose ester weight.

<Matting Agent>

Particles such as a matting agent can be added to the cellulose derivative in the invention in order to provide a good sliding property. As the particles there are inorganic compound particles and organic compound particles.

The content of the particles in the organic-inorganic hybrid film is preferably 0.01 to 1.0 g, more preferably 0.03 to 0.5 g, and still more preferably 0.08 to 0.3 g per $m^2$ of the film. It is preferred that such addition of the particles forms protrusions with a height of 0.1 to 1 µm, which provides a good slidability of the film.

Examples of the inorganic compound particles include silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate. Of these matting agents, compounds containing silicon, particularly silicon dioxide is preferable in providing low turbidity and a reduced haze of the film.

The particles such as silicon dioxide particles are often surface treated with an organic compound, and such surface treated particles are preferable in giving a reduced haze to the film. Examples of the organic compound used in the surface treatment include halogenated silanes, alkoxysilanes, silazanes, and siloxanes.

The silicon dioxide particles can be prepared, for example, by burning a mixture of hydrogen and a gaseous silicon tetrachloride at 1,000 to 1,200° C. in air.

The silicon dioxide particles preferably have an average primary particle size of not more than 20 nm and an apparent specific gravity of not less than 70 g/l (liter). The primary particles of the particles have an average particle size of more preferably from 5 to 16 nm, and most preferably 5 to 12 nm. The particles having a smaller average primary particle size have lower haze and are preferred. The apparent specific gravity of the particles is more preferably from 90 to 200 g/l, and most preferably from 100 to 200 g/l. Particles of higher apparent specific gravity are preferably used in preparing a dispersion having a high concentration, in improving a haze and in producing no aggregates.

Preferred examples of the silicon dioxide particles include, for example, Aerosil R972, R972V, R974, R812, 200, 200V, 300, R202, OX50, or TT 600 (each produced by Nippon Aerosil Co., Ltd.), and are preferably Aerosil 200V, R972, R972V, R974, R202 or R812. As zirconium oxide particles, commercially available products, for example, Aerosil R976 and R811 each produced by Nippon Aerosil Co., Ltd., can be used.

Of these, Aerosil 200V, R972, and TT600 are especially preferred, since they can lower haze and can greatly lower coefficient of friction.

As organic compound particles, there are silicon resin particles, fluorine-containing resin particles, and acryl resin particles. Of these, silicon resin particles are preferred, and silicon resin particles having a three dimensional cross-linking structure are more preferred. Examples of such particles include Tospearl 103, 105, 108, 120, 145, 3210, or 240, each produced by Toray Co., Ltd.

The inorganic compound particles added as a matting agent can provide good sliding property and prevent blocking. However, excessive amount of the inorganic compound particles markedly increase aggregates or haze. The effects of the invention obtained by addition of the polycondensation product in the invention cannot be obtained by addition of these inorganic compound particles.

The average primary particle size of the particles in the invention is measured employing a transmission type electron microscope. That is, the primary particle size of one hundred particles is measured through the transmission type electron microscope at a magnifying factor of 50,000 to 400,000, and its average value is defined as the average primary particle size.

The apparent specific gravity referred to in the invention is computed from the following formula:

Apparent specific gravity(g/l)=weight of silicon dioxide particles(g)/volume of silicon dioxide particles (l)

wherein the volume of silicon dioxide particles is the volume in which a certain amount of silicon dioxide particles are put in a messcylinder and measured employing the messcylinder and the weight of silicon dioxide particles is the weight of the silicon dioxide particles put in the messcylinder.

<Film Manufacture>

Next, a preferred method of manufacturing an organic-inorganic hybrid film will be explained.

The organic-inorganic hybrid film can be manufactured according to a solution cast film manufacturing method.

1) Dissolution Step

A preparing method of dope containing cellulose derivative will be explained.

The dissolution step is one in which cellulose derivative (in the flake form), a polymer or additives are dissolved, while stirring, in organic solvents mainly comprised of good solvents for the cellulose derivative, employing a dissolution vessel, or a polymer solution or an additive solution is added to a cellulose derivative solution, whereby a dope is prepared.

In order to carry out dissolution of cellulose derivative, there are various methods such as a method in which dissolution is carried out at a normal atmospheric pressure, a method in which dissolution is carried out at a temperature lower than the boiling point of the main solvent, a method in which dissolution is carried out at a temperature higher than the boiling point of the main solvent under an increase of pressure, a cooling dissolution method disclosed in Japanese Patent O.P.I. Publication Nos. 9-95544, 9-95557, and 9-95538, and a method in which dissolution is carried out at a high pressure disclosed in Japanese Patent O.P.I. Publication No. 11-21379. The method is especially preferred in which dissolution is carried out at a temperature higher than the boiling point of the main solvent under an increase of pressure.

The cellulose derivative concentration of the dope is preferably from 10 to 35% by weight. The resultant dope is filtered employing filter materials, is then defoamed, and is subsequently pumped to the next process.

Next, a preparing method of dope containing a condensation polymerizable reactive metal compound will be explained. When a condensation polymerizable reactive metal compound is added to the cellulose derivative dope, a 10 to 50% condensation polymerizable reactive metal compound solution, in which the condensation polymerizable reactive metal compound is dissolved in the main solvent of the dope, is preferably added in order not to precipitate the cellulose derivative in the dope. For the same reason, the cellulose derivative dope may be further diluted with the main solvent, as a not more than 10% by weight cellulose derivative dope.

When a catalyst or water is added to a condensation polymerizable reactive metal compound solution, the solution may contain an alcohol solvent such as methanol, ethanol, or methylcellosolve in an amount of not more than 50% by weight based on the total weight of solvents so that it is miscible with the condensation polymerizable reactive metal compound.

A part or all of additives such as plasticizers or UV absorbents may be added to the latter dope. All the materials are dissolved in a solvent, and the resulting dope is filtered employing filter materials, is then defoamed, and is subsequently pumped to the next process.

Mixing of the cellulose derivative dope and the condensation polymerizable reactive metal compound dope will be explained below.

It is preferred that the cellulose derivative dope and the condensation polymerizable reactive metal compound dope, each individually prepared, are filtered and then mixed. The mixing method is not specifically limited, but it is preferred that the condensation polymerizable reactive metal compound dope is little by little added while slowly stirring to the cellulose derivative dope. The two dopes are completely mixed, and the resulting dope is filtered employing filter materials, is then defoamed to obtain a final dope, and is subsequently pumped to the next process.

2) Casting Step

The casting step is one in which a dope is conveyed to a pressure die through a pump (for example, a pressure type metering gear pump), and cast from said pressure die onto a casting site of a moving endless metal belt such as a stainless steel belt or a metal support such as a rotating metal drum. The pressure die is preferred in which the slit shape at the mouth piece portion can be regulated and the layer thickness is readily controlled to be uniform. The surface of the metal support for casting is specular. In order to increase the casting speed, two or more pressure dies may be provided on the metal support and dopes divided into two or more may be simultaneously cast on the metal support. It is preferred that plural dopes is simultaneously cast according to a co-casting method to obtain an organic-inorganic hybrid film having a laminate structure.

3) Solvent Evaporation Step

The solvent evaporation step is one in which a web is heated on a metal support and solvents are evaporated till the web is capable of being peeled from the metal support. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined. It is preferred in the reverse surface liquid heating method that heating is carried out at a temperature not more than the boiling point of the main solvent or a solvent having the lowest boiling point of solvents used.

4) Peeling Step

The peeling step is one in which a web, which has been subjected to evaporation of solvents on the support, is peeled at the peeling site. The peeled web is conveyed to the subsequent step. When the residual solvent amount (refer to the formula described below) is too excessive, it may be difficult to peel the web. On the contrary, when peeling is carried out after fully drying the web on the support, a part of the web may peel prior to the peeling site.

Listed as a method to increase the film forming speed is a gel casting method (in which peeling can be carried out even though the amount of residual solvents is relatively great). The gel casting methods include a method in which poor solvents with respect to the cellulose ester are added to a dope and gelling is carried out after casting the dope, and also a method in which gelling is carried out by decreasing the temperature of a metal support, and the like. By strengthening the web through gelling the dope on the metal support, it is possible to carry out earlier peeling and to increase the casting speed.

The web on the metal support is preferably peeled at the time when the residual solvent amount is in the range of 5 to 150% by weight depending on the drying conditions or the length of the metal support. If the web is peeled at the time when the residual solvent amount is more, the peeled web is too soft, and is likely to lose its flatness and produce streaks or wrinkles due to peeling tension applied. The residual solvent of the web at peeling is determined considering economic reason and quality. In the invention, at the peeling position on the metal support, temperature of the web is −50 to 40° C., preferably 10 to 40° C., and more preferably 15 to 35° C. At the peeling position on the metal support, the residual solvent content of the web is preferably 10 to 150% by weight, and more preferably 10 to 120% by weight.

In the invention, the residual solvent content is expressed by the following formula:

Residual solvent content of web (% by weight)=$\{(M-N)/N\} \times 100$ wherein M represents weight of the web to be measured, and N represents weight of the web after the web to have been measured has been dried at 110° C. for 3 hours, 5) Drying Step and Stretching Step The peeled web is generally dried at a drying step of drying the web employing a drying apparatus in which the web is alternatively passed through staggered rollers and/or employing a tenter apparatus in which the web is conveyed while holding both edges of the web employing clips.

In the invention, as a means of stretching the peeled web in the transverse direction between the clips by a magnification of from 1.0 to 2.0, a tenter apparatus is preferably employed. A tenter apparatus capable of stretching the web in the transverse and mechanical directions is more preferably employed. The stretching magnification is determined according to desired optical properties (for example, $R_o$ or $R_t$). An optical retardation film can be also prepared by uniaxially stretching the web in the mechanical direction.

Surprisingly, it has been found that $R_o$ and $R_t$ per unit thickness of the film can be increased by adding the polycondensation product in the invention to the cellulose derivative. The above can provide a thin optical retardation film with excellent durability, and variation of $R_o$ and $R_t$ of the film is small at high temperature and high humidity.

A common drying method is one in which both surfaces of the web are heated by heated air flow. Instead of the air flow, employed is a method in which heating is carried out employing microwaves. Too rapid drying tends to degrade the flatness of the finished film. During the entire drying step, drying temperature is commonly from 40 to 250° C. Drying temperature, drying time, and air volume for drying vary depending on employed solvents. Thus, drying conditions may be properly selected depending on types of employed solvents and their combination.

The thickness of the film is not specifically limited, but for example, a film having a thickness of from 10 $\mu$m to 1 mm can be prepared. The thickness of the finished film after completion of drying and stretching is preferably from 10 to 500 $\mu$m, and more preferably from 30 to 200 $\mu$m.

<Functional Layer>

A functional layer such as a layer of a metal oxide, a metal nitride, a metal nitride oxide or an organic polymer can be provided on the hybrid polymer film in the invention organic-inorganic in order to give functionality to the film. The functional film may be plural.

The metal oxide, metal nitride, or metal nitride oxide described above is not specifically limited but examples thereof include an oxide, nitride or nitride oxide of at least one metal selected from the group consisting of silicon, zirconium, titanium, tungsten, tantalum, aluminum, zinc, indium, chromium, vanadium, tin and niobium. Silicon oxide, aluminum oxide or silicon nitride is especially preferred.

The metal oxide layer can be formed according to various methods such as a deposition method, a sputtering method, a plasma CVD method, a coating method, and a vacuum deposition method. The metal oxide layer is preferably formed according to an atmospheric pressure plasma treatment described later.

Organic polymeric compounds include heat hardenable resins or actinic ray hardenable resins such as UV ray hardenable resins or electronic beam hardenable resins. The UV hardenable resins are preferred. The UV ray hardenable resins include a UV ray hardenable acrylurethane resin, a UV ray hardenable polyesteracrylate resin, a UV ray hardenable epoxyacrylate resin, a UV ray hardenable polyolacrylate resin and a UV ray hardenable epoxy resin.

Examples of function of such a functional layer include antireflection function, antiglare function, half-mirror function, gas barrier function, conduction function, antistatic function, viewing angle increasing function, color correction filter function, color separation function, UV or IR shielding function, anti-stain function, and hard coat function.

<Antireflection Layer>

An antireflection layer as one example of the functional layer can be provided on the organic-inorganic hybrid film of the invention. The antireflection layer may be single or plural, and plural antireflection layers generally have a structure in which a high refractive index layer and a low refractive index layer are laminated alternately.

As the antireflection layer, there are one in which a high refractive index layer and a low refractive index layer are provided on a transparent substrate in that order, and one in which a medium refractive index layer, a high refractive index layer and a low refractive index layer are provided on a transparent substrate in that order, the medium refractive index layer having a refractive index higher than that of the substrate or a hard coat layer, and a refractive index lower than that of the high refractive index layer. Further, one is proposed in which more antireflection layers are laminated. A structure, in which a medium refractive index layer, a high refractive index layer and a low refractive index layer are provided in that order on a hard coat layer provided on a substrate, is preferred in view of durability, optical properties, cost and productivity. A structure is also preferred in which an anti-stain layer is further provided as an outermost layer.

The especially preferred antireflection layer is an optical interference layer in which a high refractive index layer and a low refractive index layer are provided in that order on a substrate (or on a medium refractive index layer provided on a substrate), the optical thickness of each layer being set to an appropriate value relative to a light wavelength. The refractive index and the optical thickness can be obtained from measurement of spectral reflectance.

<Atmospheric Pressure Plasma Treatment>

The atmospheric pressure plasma treatment refers to a process comprising the steps of inducing discharge between opposed electrodes at atmospheric pressure or at approximately atmospheric pressure, exciting a reactive gas to a plasma state, and exposing an organic-inorganic hybrid film to the reactive gas of the plasma state to form a metal compound layer on the film.

It is preferred in the atmospheric pressure plasma treatment process that a high electric power with a high frequency voltage is supplied in order to produce a high density of plasma to increase a layer manufacturing speed. It is preferred that an electric power of not less than 1 W/cm$^2$ is supplied at a high frequency voltage not less than 100 kHz to excite a reaction gas and produce plasma. Supply of such a high power electric field can form a layer with high density, uniform thickness, and high performance at high productivity.

Frequency of high frequency voltage applied across opposed electrodes is not more than 150 MHz, preferably not less than 200 kHz, and more preferably not less than 800 kHz. Electric power supplied between opposed electrodes is preferably from 1.2 to 50 W/cm$^2$, and more preferably from 1.2 to 50 W/cm$^2$. Voltage application area (cm$^2$) applied to the electrodes refers to an area where discharge occurs.

The waveform of high frequency voltage applied across opposed electrodes may be a discontinuous pulse wave or a continuous sine wave, but a continuous sine wave is preferred in obtaining the effects of the invention.

Before the organic-inorganic hybrid film, which has been manufactured according to a solution cast film manufacturing method, is wound around an uptake spool, a metal compound layer is preferably formed on the film according to atmospheric pressure plasma discharge treatment.

<Atmospheric Pressure Plasma Discharge Treatment Apparatus>

Figure 2:
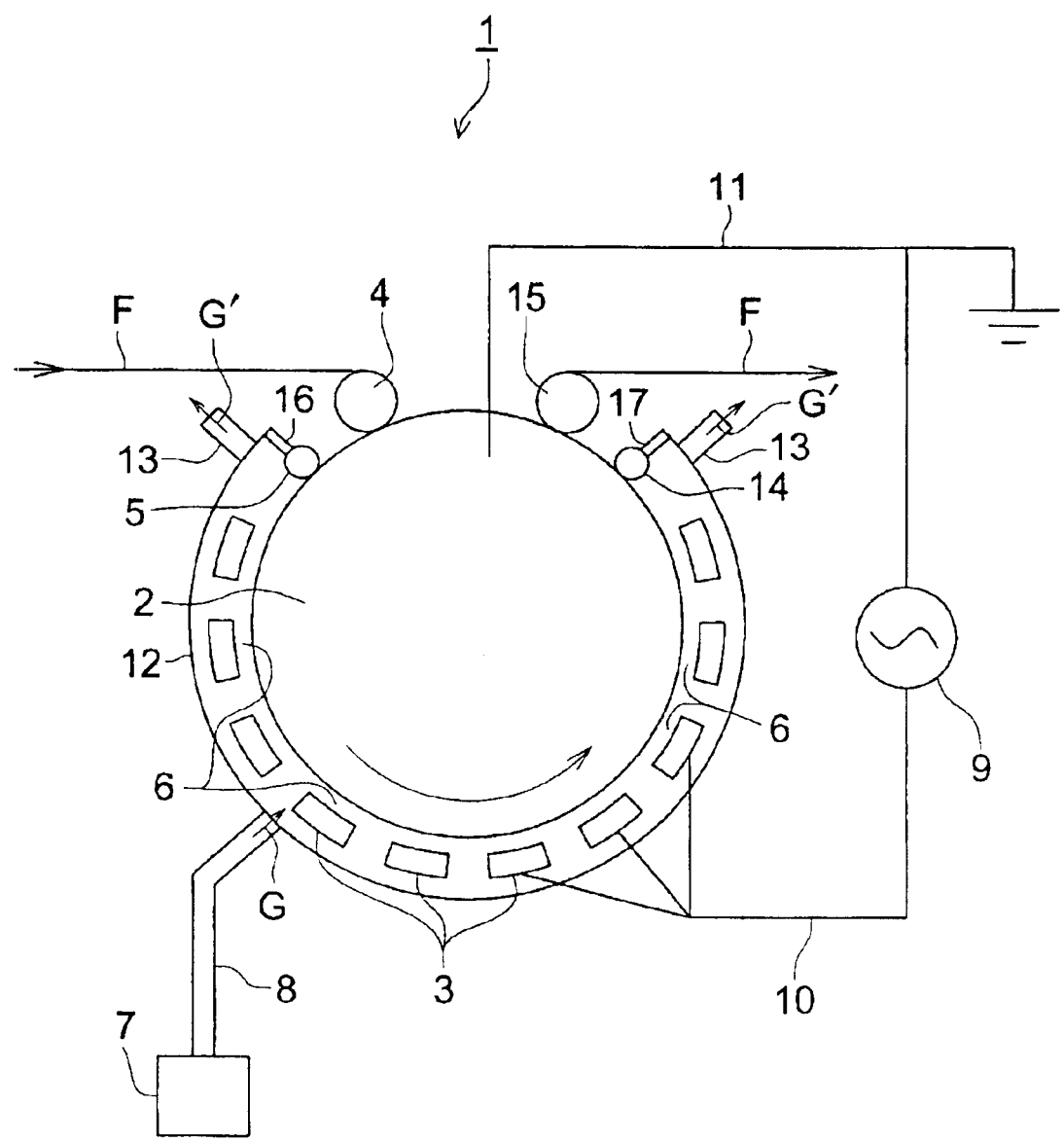
FIG. 2 shows a schematic drawing of one embodiment of an atmospheric pressure plasma discharge treatment apparatus. for forming a metal oxide layer according to atmospheric pressure plasma discharge treatment.

FIG. 2 shows a schematic drawing of one embodiment of an atmospheric pressure plasma discharge treatment apparatus used in order to form a metal oxide layer according to an atmospheric pressure plasma discharge treatment. The atmospheric pressure plasma discharge treatment will be explained employing FIG. 2.

In FIG. 2, the plasma discharge treatment apparatus 1 comprises a rotating electrode 2 and plural fixed counter electrodes 3 arranged to oppose the rotating electrode. A substrate film F from a supply spool (not illustrated) or the previous process is transported to the rotating electrode 2 through a guide roller 4 and a nip roller 5, and further transported in synchronism with the rotation of the rotating electrode 2 while contacting the rotating electrode 2.

A reaction gas G generated in a reaction gas generation device 7 is introduced through a gas supply pipe 8 into a plasma discharge section 6 at atmospheric pressure or at approximately atmospheric pressure where a layer (a metal oxide layer) is formed on the substrate film F surface facing the counter electrodes.

Although not illustrated, plural gas supply pipes 8 are preferably provided so that the reaction gas is supplied between two adjacent counter electrodes so as to supply the reaction gas in a uniform concentration and flow rate along the transverse direction of the substrate film F.

The power supply 9, which is capable of applying voltage for plasma generation, is connected to the rotating electrode 2 and the counter electrodes 3 through voltage applying members 10 and 11. The rotating electrode 2, the counter electrodes 3 and the discharge section 6 are covered with a plasma discharge vessel 12 and segregated from the exterior.

Waste gas G' is exhausted from a gas exhaust port 13 arranged at an upper portion of the discharge section. Waste gas G' is also exhausted from other gas exhaust ports (not illustrated) provided between adjacent two of the counter electrodes 3.

The substrate film F subjected to the plasma discharge treatment is transported to the next process or to an uptake spool (not illustrated) through a nip roller 14 and a guide roller 15. It is preferred that a blade 16 is provided to contact the nip roller 5 arranged at the inlet of the substrate film F in order to prevent air accompanied by substrate film F from entering the discharge section, and a blade 17 is provided to contact the nip roller 14 arranged at the outlet of the substrate film F in order to prevent external air from entering the discharge section. Although not illustrated, the rotating electrode 110 and fixed electrodes 111 have a structure in which their temperature is adjusted by a circulated temperature-controlled medium.

The amount of the air entering the discharge section, accompanied by substrate film F, is preferably from not more than 1% by volume, and more preferably not more than 0.1% by volume, based on the total volume of air in the plasma discharge vessel 12. Such an amount of the air can be attained by the nip roller 5.

The pressure in the plasma discharge vessel 12 is preferably high. It is preferred that the pressure in the plasma discharge vessel 12 is higher than the atmospheric pressure by not less than 0.1 kPa, and preferably from 0.3 to 10 kPa. Although not illustrated, the rotating electrode 2 and counter electrodes 3 have a structure in which their temperature is adjusted by a circulated temperature-controlled medium. The medium is preferably an insulating material such as distilled water or oil.

The level of voltage applied to the counter electrode 3 by power source 9 is optionally determined. For example, it is preferred that the voltage is from 0.5 to 10 kV, and frequency of power source is adjusted to the range of from more than 100 kHz to 150 MHz. Herein, as a voltage application method, either a continuous oscillation mode (called a continuous mode) with a continuous sine wave or a discontinuous oscillation mode (called a pulse mode) carrying ON/OFF discontinuously may be used, but the continuous mode is preferred in obtaining a uniform layer with high quality.

As the power source 9 for applying voltage to the opposed electrodes, a high frequency power source (200 kHz) produced by Pearl Kogyo Co., Ltd., a high frequency power source (800 kHz) produced by Pearl Kogyo Co., Ltd., a high frequency power source (13.56 MHz) produced by Nippon Denshi Co., Ltd., and a high frequency power source (150 MHz) produced by Pearl Kogyo Co., Ltd. can be used, but the invention is not specifically limited thereto.

The gap distance between the opposed electrodes in the discharge section 6 is determined considering thickness of a dielectric layer provided on the electrode base, applied voltage level or frequency, or an object of employing plasma. When one of the opposed electrodes (electrodes 2 and 3) described above has a dielectric layer or both opposed electrodes described above have a dielectric layer, the minimum gap distance between the electrode and the dielectric layer or between the both dielectric layers is preferably 0.5 to 20 mm, more preferably 0.5 to 5 mm, and still more preferably 1±0.5 mm, in carrying out uniform discharge.

The vessel used in the plasma discharge vessel 12 is preferably a vessel of pyrex (R) glass or plastic, but a vessel of metal may be used if insulation from the electrodes is secured. For example, the vessel may be a vessel of aluminum or stainless steel laminated with a polyimide resin or a vessel of the metal which is thermally sprayed with ceramic to form an insulation layer on the surface.

Substrate temperature may vary physical properties or composition of layers formed on the substrate film. In order to minimize an influence on the substrate during the discharge plasma treatment, the substrate temperature is preferably controlled during the plasma discharge treatment. The substrate temperature varies according to treatment conditions, but is preferably adjusted to a temperature of preferably from room temperature to 200° C., and more preferably from room temperature to 120° C. The substrate temperature is preferably from ordinary temperature (15 to 25° C.) to less than 200° C., more preferably from 50° C. to less than 150° C., and still more preferably from 60° C. to less than 120° C. In order to adjust to the temperature within the range described above, the substrate or the electrodes are optionally cooled with a cooling means during the discharge plasma treatment.

In the invention, the discharge plasma treatment is carried out at atmospheric pressure or at approximately atmospheric pressure. Herein, approximately atmospheric pressure herein referred to implies a pressure of 20 kPa to 200 kPa. In order to obtain the effects as described in the invention, the pressure is preferably 90 kPa to 110 kPa, and more preferably 93 kPa to 104 kPa.

In the electrodes for electric discharge used in the atmospheric pressure plasma discharge treatment, the maximum surface roughness Rmax of the surface of the electrode on the side contacting the substrate is adjusted to preferably not more than 10 μm, more preferably not more than 8 μm, and still more preferably not more than 7 μm. Herein, the maximum surface roughness is one defined in JIS B 0161.

The electrodes described above are preferably coated with a dielectric layer, and it is especially preferred that a conductive base of a metal is coated with the dielectric layer. Examples of the dielectric include plastics such as polytetrafluoroethylene and polyethylene terephthalate; glass; metal oxides such as silicon dioxide, aluminum oxide ($Al_2O_3$), zirconium oxide ($ZrO_2$), and titanium oxide ($TiO_2$), complex metal oxides such as barium titanate. The dielectric layer is preferably a layer formed by thermally spraying ceramic on the base to form a ceramic layer, and sealing the ceramic layer with sealing materials such as inorganic compounds. Examples of a metal used in the conductive base include metals such as silver, platinum, stainless steel, aluminum, and iron. Stainless steel is preferable in view of processability. Examples of the materials for lining include silicate glass, borate glass, phosphate glass, germanate glass, tellurite glass, aluminate glass, and vanadate glass. Among these, borate glass is preferably used in view of easy processability.

The electrodes above optionally have a structure in which a heating means or a cooling means is provided within the electrodes. When the electrodes are in the belt form, the electrodes are cooled applying a cooled air on the rear side of the belt. When the electrodes are in the roll form, temperature of the outer surface of the electrodes or the substrate film contacting the surface are preferably controlled supplying a medium to the inside of the electrodes.

The roll electrode 2 preferably has a temperature controlling means so that the temperature difference of the substrate film along the mechanical and transverse directions is minimized on plasma discharge treatment. The temperature difference is within the range of preferably ±10° C., more preferably ±5° C., still more preferably ±1° C., and most preferably ±0.1° C.

<Reaction Gas>

A reactive gas G used in the plasma discharge treatment is basically a reaction gas, a mixed gas of discharge gas and a reactive gas for forming a layer, although it varies due to kinds of a layer formed on the substrate film F. The reactive gas content of the reaction gas is preferably 0.01 to 10% by volume.

The dischage gas herein referred to implies an element belonging to group XVIII in the periodic table, and is typically helium, neon, argon, krypton, xenon, or radon, or nitrogen. In order to obtain the effects of the invention, helium, argon or nitrogen is preferably used.

As the reactive gas, a metal compound is used, and an organometallic compound such as a metal hydride or a metal alkoxide is preferably used. The metal hydride or metal alkoxide is preferably used in view of handling, and the metal alkoxide is more preferably used, since it is not corrosive, and generates no harmful gas nor causes contamination.

The organometallic compounds, which are introduced in a discharge space, may be in the form of gas, liquid, or solid at ordinary temperature and ordinary pressure. When they are gas at ordinary temperature and ordinary pressure, they can be introduced in the discharge space as they are. When they are liquid or solid, they are gasified by heating, pressure reduction or ultrasonic wave radiation, and used. The organometallic compound gas content of the reaction gas is preferably 0.01 to 10.0% by volume, and more preferably 0.1 to 5% by volume.

A reactive gas contains a component which is excited to plasma state to form a layer, and as the reactive gas, there is an organometallic compound, an organic compound, or an inorganic compound, which contributes to layer formation, or a hydrogen gas, an oxygen gas or a carbon dioxide gas, which is used as an auxiliary agent further containing a component selected from oxygen, ozone, hydrogen peroxide, carbon dioxide, carbon monoxide, hydrogen and nitrogen in an amount of 0.01 to 5% by volume can accelerate reaction, and can form a layer with high density and high quality.

<Reactive Gas for High Refractive Index Layer>

Examples of a titanium compound used for a high refractive index layer include an organotitanium compound, a titanium hydride compound and a titanium halide compound. Examples of the organotitanium compound include triethyltitanium, trimethyltitanium, triisopropyltitanium, tributyltitanium, tetraethyltitanium, tetraisopropyltitanium, tetrabutyltitanium, triethoxytitanium, trimethoxytitanium, triisopropoxytitanium, tributoxytitanium, tetraethoxytitanium, tetraisopropoxytitanium, dimethyldimethoxytitanium, ethyltriethoxytitanium, methyltriisopropoxytitanium, tetradimethylaminotitanium, dimethyltitanium diacetoacetonate, and ethyltitanium triacetoacetonate. Examples of the titanium hydride compound include monotitanium hydride and dititanium hydride. Examples of the titanium halide compound include titanium trichloride, titanium tetrachloride.

<Reactive Gas for Medium Refractive Index Layer>

Examples of a tin compound include an organotin compound, a tin hydride compound and a tin halide compound. Examples of the organotin compound include tetraethyltin, tetramethyltin, di-n-butyltin diacetate, tetrabutyltin, tetraoctyltin, tetraethoxytin, methyltriethoxytin, diethyldiethoxytin, triisopropylethoxytin, diethyltin, dimethyltin, diisopropyltin, dibutyltin, diethoxytin, dimethoxytin, diisopropoxytin, dibutoxytin, tin dibutyrate, ethyltin diacetoacetonate, ethoxytin diacetoacetonate, and dimethyltin diacetoacetonate. Examples of the tin halide compound include tin dichloride and tin tetrachloride. A layer formed employing such a tin compound is useful as an antistatic layer, since the specific resistance of the layer can be lowered to not more than $10^{11}$ $\Omega/cm^2$.

<Reactive Gas for Low Refractive Index Layer>

Examples of the metal compound include a silicon compound such as an organosilicon compound, a silicon hydride compound or a silicon halide compound. Examples of the organosilicon compound include tetraethylsilane, tetramethylsilane, tetraisopropylsilane, tetrabutylsilane, tetraethoxysilane, tetraisopropoxysilane, tetrabutoxysilane, dimethyldimethoxysilane, dimethyldiethoxysilane, diethyldiethoxysilane, diethylsilane diacetoacetonate, methyltrimethoxysilane, methyltriethoxysilane, and ethyltriethoxysilane. Examples of the silicon hydride compound include momosilane and disilane. Examples of the silicon halide compound include tetrachlorosilane, methyltrichlorosilane, and diethyldiichlorosilane. These reactive gases can be singly or as a mixture of two or more kinds thereof.

The total thickness of a metal compound layer formed according to atmospheric pressure plasma discharge treatment is preferably from 0.01 to 0.2 µm. The thickness of the high refractive index layer, medium refractive index layer or low refractive index layer described above is preferably from 0.01 to 0.2 µm.

<Actinic Ray Hardened Resin Layer>

In the organic-inorganic hybrid film of the invention, a metal compound layer such as the high, medium or low refractive index layer described above may be provided directly on the substrate film, but the metal compound layer may be provided through an intermediate layer on the substrate film. Examples of the intermediate layer include an anti-glare layer and a clear hard coat layer. These layers are preferably actinic ray hardened layers, which have been hardened by an actinic ray such as UV light.

When a metal oxide layer is formed on the substrate film according to atmospheric pressure plasma discharge treatment, these intermediate layers increase adhesion force and improve plasma resistance. Thus, properties of the metal compound layer on the intermediate layers can be greatly improved as compared with those of the metal compound layer directly on the substrate film surface. Further, the intermediate layer improves adhesion between the metal compound layer and the substrate film.

The actinic ray hardened resin layer such as an anti-glare layer or a clear hard coat layer is a layer obtained by polymerizing a composition containing an ethylenically unsaturated monomer. Herein, the actinic ray hardened resin layer refers to a layer hardened by cross-linking reaction caused by actinic ray irradiation. An actinic ray hardenable resin is represented by a UV ray hardenable resin or an electronic beam hardenable resin, but may be a resin hardened by irradiation of actinic ray other than UV ray or electronic beam. The UV ray hardenable resins include a UV ray hardenable acrylurethane resin, a UV ray hardenable polyesteracrylate resin, a UV ray hardenable epoxyacrylate resin, a UV ray hardenable polyolacrylate resin and a UV ray hardenable epoxy resin.

EXAMPLES

Next, the present invention will be detailed employing examples, but is not specifically limited thereto. In the examples, "part" and "parts" represents "part by weight" and "parts by weight", respectively, unless otherwise specifically specified.

Example 1

<Preparation of Dope>

Dope was prepared employing three vessels, vessel A, vessel B and vessel C. Vessel A and vessel B each connect vessel C via a filter, wherein dope in vessel A and dope in vessel B are transferred to vessel C and mixed therein. vessel C connects a die via a filter.

Materials described below were incorporated in a vessel in the order described, stirred and dissolved in a solvent to prepare a dope. The dope was filtered, and was processed according to the procedures described below. Thus, Film samples 101 and 115 were prepared. Silicon dioxide particles (AEROSIL R972V) were dispersed in ethanol, and then added.

<Preparation of Film Sample 101 (Inventive)>

The following materials were placed in vessel A and dissolved to prepare Dope 1A.

| | |
|---|---|
| Methylene chloride | 432.0 parts |
| Ethanol | 38.0 parts |
| Cellulose triacetate (hereinafter referred to as TAC, degree of substitution of acetyl: 2.88) | 30.0 parts |
| Titanium tetraethoxide (Titanium oxide content: 1.9 parts, 1.5% based on the total TAC amount) | 5.5 parts |

The following materials were placed in vessel B and dissolved to prepare Dope 1B.

| | |
|---|---|
| Ethylphthalylethyl glycolate (EPEG) | 1.8 parts |
| Methylene chloride | 368.0 parts |
| Ethanol | 32.0 parts |
| TAC | 100 parts |
| AEROSIL R972V (produced by Nippon Aerosil Co., Ltd.) | 0.17 parts |

Dope 1B was transferred to vessel C, and then Dope 1A was slowly mixed with Dope 1B. Thus, Dope 1C was obtained. Dope 1C was filtered, and 34C Dope C was uniformly cast on a 33C stainless steel support, dried on the support for 60 seconds to form a web, and the web was then peeled from the support. The peeled web was dried at 80 C while transporting through rollers applying a transport tension necessary to stretch in the mechanical direction by a factor of 1.05, further dried at a 120 C drying zone while roller transporting to obtain a film, and the film was wound around a spool to form a roll film. Thus, Film sample 101 (Inventive) was prepared which had a thickness of 41 µm.

<Preparation of Film Sample 102 (Inventive)>

Dope 2A was prepared in vessel A in the same manner as Dope 1A.

Dope 2B was prepared in vessel B in the same manner as Dope 1B, except that EPEG was changed to 3.6 parts of trimethylolpropane tribenzoate (plasticizer, Exemplified compound 16, hereinafter also referred to as C-16).

Dope 2A was mixed with Dope 2B in vessel C. Thus, Dope 2C was obtained. Dope 2C was processed in the same manner as in Film sample 101. Thus, Film sample 102 (Inventive) was prepared which had a thickness of 41 µm.

<Preparation of Film Sample 103 (Inventive)>

Dope 3A was prepared in vessel A in the same manner as Dope 1A.

Dope 3B was prepared in vessel B in the same manner as Dope 1B, except that EPEG was changed to 7.3 parts of dicyclohexyl phthalate (hereinafter referred to as DCP).

Dope 3A was mixed with Dope 3B in Vessel C. Thus, Dope 3C was obtained. Dope 3C was processed in the same manner as in Film sample 101. Thus, Film sample 103 (Inventive) was prepared which had a thickness of 41 μm.

<Preparation of Film Sample 104 (Inventive)>

Dope 4A was prepared in vessel A in the same manner as Dope 1A.

Dope 4B was prepared in vessel B in the same manner as Dope 1B, except that the amount of EPEG was changed to 7.3 parts and 7.3 parts of Exemplified compound 16 were further added.

Dope 4A was mixed with Dope 4B in vessel C. Thus, Dope 4C was obtained. Dope 4C was processed in the same manner as in Film sample 101. Thus, Film sample 104 (Inventive) was prepared which had a thickness of 41 μm.

<Preparation of Film Sample 105 (Inventive)>

The following materials were placed in vessel A and dissolved to prepare Dope 5A.

| Methylene chloride | 0.45 parts |
| Ethanol | 0.45 parts |
| Tetraethoxysilane (Silicon oxide content: 1.9 parts, 0.2% based on the total TAC amount) | 0.90 parts |
| Aqueous 13% trifluoroacetic acid solution | 0.15 parts |

The following materials were placed in vessel B and dissolved to prepare Dope 5B.

| Ethylphthalylethyl glycolate (EPEG) | 7.3 parts |
| Trimethylolpropane tribenzoate (C-16) | 7.3 parts |
| TINUVIN 326 (hereinafter referred to as T326) | 1.3 parts |
| Methylene chloride | 777.1 parts |
| Ethanol | 66.3 parts |
| TAC | 130 parts |
| AEROSIL R972V (produced by Nippon Aerosil Co., Ltd.) | 0.17 parts |

Dope 5B was transferred to vessel C, and then Dope 5A was slowly mixed with Dope 1B. Thus, Dope 5C was obtained. Dope 5C was processed in the same manner as in Film sample 101. Thus, Film sample 105 (Inventive) was prepared which had a thickness of 41 μm.

<Preparation of Film Sample 106 (Inventive)>

The following materials were placed in vessel A and dissolved to prepare Dope 6A.

| Methylene chloride | 4.9 parts |
| Ethanol | 1.7 parts |
| Tetraethoxysilane (Silicon oxide content: 1.9 parts, 1.5% based on the total TAC amount) | 6.6 parts |
| Aqueous 13% trifluoroacetic acid solution | 1.1 parts |

Dope 6B was prepared in vessel B in the same manner as Dope 5B.

Dope 6A was mixed with Dope 6B in vessel C. Thus, Dope 6C was obtained. Dope 6C was processed in the same manner as in Film sample 101. Thus, Film sample 106 (Inventive) was prepared which had a thickness of 41 μm.

<Preparation of Film Sample 107 (Inventive)>

The following materials were placed in vessel A and dissolved to prepare Dope 7A.

| Methylene chloride | 45.1 parts |
| Ethanol | 45.1 parts |
| Tetraethoxysilane (Silicon oxide content: 1.9 parts, 20% based on the total DAC amount) | 90.2 parts |
| Aqueous 13% trifluoroacetic acid solution | 14.7 parts |

The following materials were placed in vessel B and dissolved to prepare Dope 7B.

| Ethylphthalylethyl glycolate (EPEG) | 7.3 parts |
| Trimethylolpropane tribenzoate (Compound 16) | 7.3 parts |
| TINUVIN 326 (hereinafter also referred to as T326) | 1.3 parts |
| Methylene chloride | 344.2 parts |
| Acetone | 344.2 parts |
| Diacetylcellulose (hereinafter also referred to as DAC, degree of substitution of acetyl: 2.33) | 130 parts |
| AEROSIL R972V (produced by Nippon Aerosil Co., Ltd.) | 0.17 parts |

Dope 7B was transferred to vessel C, and then Dope 7A was slowly mixed with Dope 7B. Thus, Dope 7C was obtained. Dope 7C was processed in the same manner as in Film sample 101, except that drying time was 300 seconds. Thus, Film sample 107 (Inventive) was prepared which had a thickness of 41 μm.

<Preparation of Film Sample 108 (Inventive)>

Dope 8A was prepared in vessel A in the same manner as Dope 1A, except that titanium tetraethoxide was changed to 6.3 parts of zirconium tributoxide monoacetylacetonate (Orgatics ZC-540, produced by Matsumoto Yushi Co., Ltd.) (zirconium oxide content 1.9 parts, 1.5% based on the total amount of TAC).

Dope 8B was prepared in vessel B in the same manner as Dope 4B.

Dope 8A was mixed with Dope 8B in vessel C. Thus, Dope 8C was obtained. Dope 8C was processed in the same manner as in Film sample 101. Thus, Film sample 108 (Inventive) was prepared which had a thickness of 41 μm.

<Preparation of Film Sample 109 (Inventive)>

Dope 9A was prepared in vessel A in the same manner as Dope 1A, except that titanium tetraethoxide was changed to 11.3 parts of aluminum di-s-butoxide ethylacetoacetate (aluminum oxide content 1.9 parts, 1.5% based on the total amount of TAC).

Dope 9B was prepared in vessel B in the same manner as Dope 4B.

Dope 9A was mixed with Dope 9B in vessel C. Thus, Dope 9C was obtained. Dope 9C was processed in the same manner as in Film sample 101. Thus, Film sample 109 (Inventive) was prepared which had a thickness of 41 μm.

<Preparation of Film Sample 110 (Inventive)>

Dope 10A was prepared in vessel A in the same manner as Dope 1A, except that TAC was changed to 30.0 parts of cellulose acetate propionate (with a degree of substitution of acetyl of 1.90 and a degree of substitution of propionyl of 0.70, hereinafter referred to as CAP).

Dope 10B was prepared in vessel B in the same manner as Dope 4B, except that TAC was changed to 100.0 parts of CAP.

Dope 10A was mixed with Dope 10B in vessel C. Thus, Dope 10C was obtained. Dope 10C was processed in the same manner as in Film sample 101. Thus, Film sample 110 (Inventive) was prepared which had a thickness of 41 μm.

<Preparation of Film Sample 111 (Inventive)>

Dope 11A was prepared in vessel A in the same manner as Dope 4A, except that TAC was changed to 30.0 parts of ethyl cellulose (produced by Wako Junyaku Co. Ltd., hereinafter also referred to as EC).

Dope 11B was prepared in vessel B in the same manner as Dope 4B, except that TAC was changed to 100.0 parts of EC.

Dope 11A was mixed with Dope 11B in vessel C. Thus, Dope 11C was obtained. Dope 11C was processed in the same manner as in Film sample 101. Thus, Film sample 110 (Inventive) was prepared which had a thickness of 41 µm.

<Preparation of Film Sample 112 (Comparative)>

A dope was prepared in the same manner as dope 5B, and the resulting dope was processed in the same manner as in Film sample 101. Thus, Film sample 112 (Comparative) was prepared which had a thickness of 41 µm.

<Preparation of Film Sample 113 (Comparative)>

Dope 13A was prepared in vessel A in the same manner as Dope 1A.

Dope 13B was prepared in vessel B in the same manner as Dope 1B, except that EPEG was not added.

Dope 13A was mixed with Dope 13B in vessel C. Thus, Dope 13C was obtained. Dope 13C was processed in the same manner as in Film sample 101. Thus, Film sample 113 (Comparative) was prepared which had a thickness of 41 µm.

<Preparation of Film Sample 114 (Comparative)>

A dope 14C was prepared in the same manner as dope 5B, except that 130 parts of TAC were changed to 130 parts of CAP, and the resulting dope was processed in the same manner as in Film sample 101. Thus, Film sample 114 (Comparative) was prepared which had a thickness of 41 µm.

<Preparation of Film Sample 115 (Comparative)>

Dope 15A was prepared in vessel A in the same manner as Dope 10A.

Dope 15B was prepared in vessel B in the same manner as Dope 10B, except that neither EPEG nor C-16 was added.

Dope 15A was mixed with Dope 15B in vessel C. Thus, Dope 15C was obtained. Dope 15C was processed in the same manner as in Film sample 101. Thus, Film sample 115 (Comparative) was prepared which had a thickness of 41 µm.

<Preparation of Film Sample 116 (Inventive)>

The following materials were placed in vessel A and dissolved to prepare Dope 16A.

| | |
|---|---|
| Methylene chloride | 6 parts |
| Tetraethoxysilane (Silicon oxide content: 1.9 parts, 2% based on the total TAC amount) | 5 parts |
| Aluminum-di-s-butoxide ethylacetoacetate (aluminum oxide content: 1.9 parts, 0.45% based on the total TAC amount) | 2.3 parts |

The following materials were placed in vessel B and dissolved to prepare Dope 16B.

| | |
|---|---|
| Ethylphthalylethyl glycolate (EPEG) | 5.5 parts |
| Trimethylolpropane tribenzoate (C-16) | 5.0 parts |
| TINUVIN 326 (hereinafter referred to as T326) | 0.2 parts |
| TINUVIN 109 (hereinafter referred to as T109) | 0.5 parts |
| TINUVIN 171 (hereinafter referred to as T171) | 0.6 parts |
| Methylene chloride | 480 parts |
| Ethanol | 40.0 parts |
| TAC | 100 parts |
| AEROSIL R972V (produced by Nippon Aerosil Co., Ltd.) | 0.17 parts |

Dope 16B was transferred to vessel C, and then Dope 16A was slowly mixed with Dope 1B. Thus, Dope 16C was obtained. Dope 16C was processed in the same manner as in Film sample 101. Thus, Film sample 116 (Inventive) was prepared which had a thickness of 41 µm.

<Preparation of Film Sample 117 (Inventive)>

The following materials were placed in vessel A and dissolved to prepare Dope 17A.

| | |
|---|---|
| Methylene chloride | 6 parts |
| Tetraethoxysilane (Silicon oxide content: 1.9 parts, 2% based on the total TAC amount) | 5 parts |
| Aluminum-di-s-butoxide ethylacetoacetate (aluminum oxide content: 1.9 parts, 0.45% based on the total TAC amount) | 2.3 parts |

The following materials were placed in vessel B and dissolved to prepare Dope 17B.

| | |
|---|---|
| Ethylphthalylethyl glycolate (EPEG) | 2.3 parts |
| Triphenyl phosphate (TPP) | 9.0 parts |
| T326 | 0.2 parts |
| T109 | 0.5 parts |
| T171 | 0.6 parts |
| Methylene chloride | 480 parts |
| Ethanol | 40.0 parts |
| TAC | 100 parts |
| AEROSIL R972V (produced by Nippon Aerosil Co., Ltd.) | 0.17 parts |

Dope 17B was transferred to vessel C, and then Dope 17A was slowly mixed with Dope 17B. Thus, Dope 17C was obtained. Dope 17C was processed in the same manner as in Film sample 101. Thus, Film sample 117 (Inventive) was prepared which had a thickness of 41 µm.

<Preparation of Film Sample 118 (Inventive)>

The following materials were placed in vessel A and dissolved to prepare Dope 18A.

| | |
|---|---|
| Methylene chloride | 6 parts |
| Tetraethoxysilane (Silicon oxide content: 1.9 parts, 2% based on the total TAC amount) | 5 parts |
| Aluminum-di-s-butoxide ethylacetoacetate (aluminum oxide content: 1.9 parts, 0.45% based on the total TAC amount) | 2.3 parts |

The following materials were placed in vessel B and dissolved to prepare Dope 18B.

| | |
|---|---|
| Ethylphthalylethyl glycolate (EPEG) | 11.5 parts |
| Trimethylolpropane tribenzoate (C-16) | 10.4 parts |
| T326 | 0.2 parts |
| T109 | 0.5 parts |
| T171 | 0.6 parts |
| Methylene chloride | 480 parts |
| Ethanol | 40.0 parts |
| TAC | 100 parts |

-continued

| | |
|---|---|
| AEROSIL R972V (produced by Nippon Aerosil Co., Ltd.) | 0.17 parts |

Dope 18B was transferred to vessel C, and then Dope 18A was slowly mixed with Dope 18B. Thus, Dope 18C was obtained. Dope 17C was processed in the same manner as in Film sample 101. Thus, Film sample 118 (Inventive) was prepared which had a thickness of 41 μm.

<Preparation of Film Sample 119 (Inventive)>

The following materials were placed in vessel A and dissolved to prepare Dope 19A.

| | |
|---|---|
| Methylene chloride | 6 parts |
| Ethanol | 1 part |
| Tetraethoxysilane (Silicon oxide content: 1.9 parts, 2% based on the total TAC amount) | 5 parts |
| Aluminum-di-s-butoxide ethylacetoacetate (aluminum oxide content: 1.9 parts, 0.45% based on the total TAC amount) | 2.3 parts |
| TAC | 2.0 parts |

The following materials were placed in vessel B and dissolved to prepare Dope 19B.

| | |
|---|---|
| Ethylphthalylethyl glycolate (EPEG) | 5.5 parts |
| Trimethylolpropane tribenzoate (C-16) | 5.0 parts |
| T326 | 0.2 parts |
| T109 | 0.5 parts |
| T171 | 0.6 parts |
| Methylene chloride | 480 parts |
| Ethanol | 40.0 parts |
| TAC | 100 parts |
| AEROSIL R972V (produced by Nippon Aerosil Co., Ltd.) | 0.17 parts |

Dope 19B was transferred to vessel C, and then Dope 19A was slowly mixed with Dope 19B. Thus, Dope 19C was obtained. Dope 19C was processed in the same manner as in Film sample 101. Thus, Film sample 119 (Inventive) was prepared which had a thickness of 41 μm.

<Preparation of Film Sample 120 (Inventive)>

The following materials were placed in vessel A and dissolved to prepare Dope 20A.

| | |
|---|---|
| Methylene chloride | 6 parts |
| Ethanol | 1 part |
| Tetraethoxysilane (Silicon oxide content: 1.9 parts, 2% based on the total TAC amount) | 5 parts |
| Aqueous 30% acetic acid solution | 1.7 parts |
| TAC | 2.0 parts |

The following materials were placed in vessel B and dissolved to prepare Dope 20B.

| | |
|---|---|
| Ethylphthalylethyl glycolate (EPEG) | 11.5 parts |
| Trimethylolpropane tribenzoate (C-16) | 10.4 parts |
| T326 | 0.2 parts |
| T109 | 0.5 parts |
| T171 | 0.6 parts |
| Methylene chloride | 480 parts |
| Ethanol | 40.0 parts |
| TAC | 100 parts |
| AEROSIL R972V (produced by Nippon Aerosil Co., Ltd.) | 0.17 parts |

Dope 20B was transferred to vessel C, and then Dope 20A was slowly mixed with Dope 20B. Thus, Dope 20C was obtained. Dope 20C was processed in the same manner as in Film sample 101. Thus, Film sample 120 (Inventive) was prepared which had a thickness of 41 μm.

<Preparation of Film Sample 121 (Comparative)>

A dope was prepared in the same manner as dope 17B, and the resulting dope was processed in the same manner as in Film sample 101. Thus, Film sample 121 (Comparative) was prepared which had a thickness of 41 μm.

<Preparation of Film Sample 122 (Comparative)>

A dope was prepared in the same manner as dope 17B, except that TAC were changed to CAP, and the resulting dope was processed in the same manner as in Film sample 101. Thus, Film sample 122 (Comparative) was prepared which had a thickness of 41 μm.

<Preparation of Film Sample 123 (Inventive)>

Dope 16A was mixed with Dope 16B in vessel C. Thus, Dope 16C was obtained. Dope 16C was processed in the same manner as in Film sample 101, except that it was processed to give a sample having a thickness of 57 μm. Thus, Film sample 123 (Inventive) was prepared.

<Preparation of Film Sample 124 (Comparative)>

A dope was prepared in the same manner as dope 17B, and the resulting dope was processed in the same manner as in Film sample 101, except that it was processed to give a sample having a thickness of 57 μm. Thus, Film sample 123 (Comparative) was prepared.

<Preparation of Film Sample 125 (Inventive)>

Dope 16A was mixed with Dope 16B in vessel C. Thus, Dope 16C was obtained. Dope 16C was processed in the same manner as in Film sample 101, except that it was processed to give a sample having a thickness of 80 μm. Thus, Film sample 125 (Inventive) was prepared.

<Preparation of Film Sample 126 (Inventive)>

Dope 20A was mixed with Dope 20B in vessel C. Thus, Dope 16C was obtained. Dope 20C was processed in the same manner as in Film sample 101, except that it was processed to give a sample having a thickness of 80 μm. Thus, Film sample 126 (Inventive) was prepared.

<Preparation of Film Sample 127 (Comparative)>

A dope was prepared in the same manner as dope 17B, and the resulting dope was processed in the same manner as in Film sample 101, except that it was processed to give a sample having a thickness of 80 μm. Thus, Film sample 127 (Comparative) was prepared.

The constitution of the resulting samples are shown in Table 1—1.

The following evaluations were carried out with respect to Inventive film samples 101 through 111, 116 through 120, 123, 125, and 126, and Comparative film samples 112 through 115, 121, 122, 124, and 127.

<Determination of Average Particle Diameter of Polycondensation Product>

The average particle diameter of polycondensation product was determined employing X ray small angle scattering under the following conditions.

Apparatus used: an X ray small and large angle diffractometer RINT 2500/PHOSPHORESCENT COMPOUND, produced by Rigaku Denki Co., Ltd.

Target: Copper
Output power: 40 kV–200 mA
First slit: 0.04 mm
Second slit: 0.03 mm
Acceptance slit: 0.1 mm
Scattering slit: 0.2 mm
Measurement: 2θ FT scanning method
Measurement range: 0.1 to 6°
Sampling: 0.04°
Time: 30 seconds The resulting spectra obtained by the above measurement was corrected regarding air scattering and slits, and analysis of the particle diameter distribution was carried out employing a Guinier plot method. The radius of inertia was regarded as that of a sphere.

<Measurement of Transmittance and Haze>

Transmittance and haze of the samples were measured by means of TURBIDITY METER T-2600DA produced by Tokyo Denshoku Co., Ltd.

<Measurement of Moisture Vapor Transmittance>

Moisture vapor transmittance was measured under condition A (25° C. and 90% RH) according to the method described in JIS-Z-0208.

<Measurement of Rate H5h (%) of High Temperature Dimensional Change>

Each film sample was cut into a size of 150 mm in the transverse direction (in TD direction)×120 mm in the mechanical direction (in MD direction), and employing a knife, two points 100 mm distant from each other were marked with the cross "+" on the film surface in each of the mechanical direction and the transverse direction. The resulting sample was subjected to humidity conditioning at 23±3° C. and at 55±3% RH for 24 hours, and then the distances L0 in the mechanical and transverse directions between the two points were measured through a microscope. Thereafter, the sample was further allowed to stand at 105° C. for 5 hours, and then again subjected to humidity conditioning at 23±3° C. and at 55±3% RH for 24 hours. The distances L1 in the mechanical and transverse directions between the two points of the resulting sample were measured through a microscope. The rate H5h (%) of high temperature dimensional change is represented by the following formula (11):

$$H5h(\%) = \{(L1-L0)/L0\} \times 100 \quad \text{Formula (11)}$$

The results are shown in Table 1-2.

TABLE 1-1

| Film sample No. | Cellulose derivative | Poly-Condensation product (content) | Additive (content) |
|---|---|---|---|
| 101 | TAC | TiO$_2$ (1.5%) | EPEG (1.4%) |
| 102 | TAC | TiO$_2$ (1.5%) | C-16 (2.8%) |
| 103 | TAC | TiO$_2$ (1.5%) | DCP (5.6%) |
| 104 | TAC | TiO$_2$ (1.5%) | EPEG (5.6%) C-16 (5.6%) |
| 105 | TAC | SiO$_2$ (0.2%) | EPEG (5.6%) C-16 (5.6%) T326 (1.0%) |
| 106 | TAC | SiO$_2$ (1.5%) | EPEG (5.6%) C-16 (5.6%) T326 (1.0%) |
| 107 | DAC | SiO$_2$ (20%) | EPEG (5.6%) C-16 (5.6%) T326 (1.0%) |
| 108 | TAC | ZrO$_2$ (1.5%) | EPEG (5.6%) C-16 (5.6%) |
| 109 | TAC | Al$_2$O$_3$ (1.5%) | EPEG (5.6%) C-16 (5.6%) |
| 110 | CAP | TiO$_2$ (1.5%) | EPEG (5.6%) C-16 (5.6%) |
| 111 | EC | TiO$_2$ (1.5%) | EPEG (5.6%) C-16 (5.6%) |
| 112 | TAC | None | EPEG (5.6%) C-16 (5.6%) |
| 113 | TAC | TiO$_2$ (1.5%) | None |
| 114 | CAP | None | EPEG (5.6%) C-16 (5.6%) |
| 115 | CAP | TiO$_2$ (1.5%) | None |
| 116 | TAC | SiO$_2$ (2.0%) Al$_2$O$_3$ (1.5%) | EPEG (5.6%) C-16 (5.6%) T109 (0.5%) T171 (0.6%) T326 (0.2%) |
| 117 | TAC | SiO$_2$ (2.0%) Al$_2$O$_3$ (1.5%) | EPEG (2.3%) TPP (9.0%) T109 (0.5%) T171 (0.6%) T326 (0.2%) |
| 118 | TAC | SiO$_2$ (2.0%) Al$_2$O$_3$ (1.5%) | EPEG (11.5%) C-16 (10.4%) T109 (0.5%) T171 (0.6%) |
| 119 | TAC | SiO$_2$ (2.0%) Al$_2$O$_3$ (1.5%) | EPEG (5.6%) C-16 (5.6%) T109 (0.5%) T171 (0.6%) T326 (0.2%) |
| 120 | TAC | SiO$_2$ (2.0%) Al$_2$O$_3$ (1.5%) | EPEG (5.6%) C-16 (5.6%) T109 (0.5%) T171 (0.6%) T326 (0.2%) |
| 121 | TAC | None | EPEG (2.3%) TPP (9.0%) T109 (0.5%) T171 (0.6%) T326 (0.2%) |
| 122 | CAP | None | EPEG (2.3%) TPP (9.0%) T109 (0.5%) T171 (0.6%) T326 (0.2%) |
| 123 | TAC | SiO$_2$ (2.0%) Al$_2$O$_3$ (1.5%) | EPEG (5.6%) C-16 (5.6%) T109 (0.5%) T171 (0.6%) T326 (0.2%) |
| 124 | TAC | None | EPEG (2.3%) TPP (9.0%) T109 (0.5%) T171 (0.6%) T326 (0.2%) |
| 125 | TAC | SiO$_2$ (2.0%) Al$_2$O$_3$ (1.5%) | EPEG (5.6%) C-16 (5.6%) T109 (0.5%) T171 (0.6%) T326 (0.2%) |
| 126 | TAC | SiO$_2$ (2.0%) | EPEG (5.6%) C-16 (5.6%) T109 (0.5%) T171 (0.6%) T326 (0.2%) |
| 127 | TAC | None | EPEG (2.3%) TPP (9.0%) T109 (0.5%) T171 (0.6%) T326 (0.2%) |

TABLE 1-2

| Film sample No. | Transmittance | Haze | Moisture vapor transmittance (g/m² · 24 h) | Rate of high temperature dimensional change MD | Rate of high temperature dimensional change TD | Average particle diameter (nm) | Remarks |
|---|---|---|---|---|---|---|---|
| 101 | 93.2% | 0.2% | 377.1 | 0.09% | 0.13% | 190 | Inv. |
| 102 | 93.2% | 0.2% | 323.5 | 0.07% | 0.09% | 180 | Inv. |
| 103 | 93.2% | 0.2% | 313.7 | 0.06% | 0.05% | 150 | Inv. |
| 104 | 93.2% | 0.2% | 221.8 | 0.03% | 0.05% | 90 | Inv. |
| 105 | 93.3% | 0.1% | 324.6 | 0.07% | 0.09% | 15 | Inv. |
| 106 | 93.3% | 0.1% | 324.6 | 0.04% | 0.05% | 20 | Inv. |
| 107 | 92.3% | 0.9% | 365.7 | 0.02% | 0.04% | 60 | Inv. |
| 108 | 93.1% | 0.3% | 211.5 | 0.03% | 0.06% | 180 | Inv. |
| 109 | 93.3% | 0.3% | 333.6 | 0.05% | 0.07% | 160 | Inv. |
| 110 | 93.2% | 0.2% | 252.5 | 0.04% | 0.06% | 150 | Inv. |
| 111 | 93.2% | 0.4% | 306.9 | 0.07% | 0.09% | 120 | Inv. |
| 112 | 93.3% | 0.1% | 300.0 | −0.57% | −0.16% | — | Comp. |
| 113 | 93.2% | 0.2% | 530.2 | 0.12% | 0.24% | 400 | Comp. |
| 114 | 93.3% | 0.1% | 321.0 | −0.55% | −0.26% | — | Comp. |
| 115 | 93.1% | 0.3% | 617.7 | 0.15% | 0.29% | 350 | Comp. |
| 116 | 93.2% | 0.2% | 210.5 | 0.01% | 0.02 | 10 | Inv. |
| 117 | 93.2% | 0.2% | 221.5 | 0.02% | 0.03 | 10 | Inv. |
| 118 | 93.2% | 0.2% | 155.3 | 0.10% | 0.13 | 12 | Inv. |
| 119 | 93.2% | 0.1% | 210.4 | 0.02% | 0.03 | 8 | Inv. |
| 120 | 93.2% | 0.2% | 212.5 | 0.02% | 0.03 | 10 | Inv. |
| 121 | 93.3% | 0.1% | 309.5 | −0.58% | −0.17 | — | Comp. |
| 122 | 93.2% | 0.1% | 321.3 | −0.59% | −0.19 | — | Comp. |
| 123 | 93.2% | 0.25% | 176.8 | 0.01% | 0.02 | 12 | Inv. |
| 124 | 93.3% | 0.0% | 251.6 | −0.19% | −0.11 | — | Comp. |
| 125 | 93.2% | 0.3% | 126.3 | 0.01% | 0.01 | 15 | Inv. |
| 126 | 93.2% | 0.3% | 127.6 | 0.02% | 0.02 | 15 | Inv. |
| 127 | 93.3% | 0.0% | 179.5 | −0.17% | −0.09 | — | Comp. |

Inv.: Invention
Comp.: Comparative

In Table 1-2, the content (by weight) of the polycondensation product is shown in terms of the content of oxide of the metal contained in the polycondensation product based on the cellulose derivative, and the content of the additive is that based on the cellulose derivative.

As is apparent from Table 1-2, comparative film samples 113 and 115 each containing no plasticizer exhibits undesired result of high moisture vapor transmittance, and comparative film samples 112 and 114, which contain a plasticizer but do not contain metal oxide in the form of hybrid in the TAC, have problems of high dimensional change due to loss of fixing effect of the plasticizer, although they exhibit low moisture vapor transmittance.

In contrast, inventive film sample 104 and 116, which contains a plasticizer and metal oxide in the form of hybrid in the TAC, provides a stable film with low moisture permeation and without substantial change of weight or dimension with time, as compared with film samples simply containing a plasticizer in the TAC.

Similarly, inventive film samples 101 through 103 employing another plasticizer, inventive film samples 107, 110, and 111 employing another cellulose derivative, and inventive film samples 105 through 107, 116 through 120, 123, 125, and 126 each having a different metal oxide content provide stable films with low moisture permeation and low dimensional change.

Example 2

A polarizing plate was prepared employing the film sample prepared in Example 1. The film samples 101 through 127 prepared in Example 1 was subjected to saponification in which the samples were immersed in an aqueous 2 mol/liter potassium hydroxide solution at 37° C. for 90 seconds, washed with water for 90 seconds, and dried.

The saponified film samples obtained above was employed as a polarizing plate protective film, and polarizing plate samples 201 through 227 as shown in Table 2 were prepared according to the following procedures.

<Preparation of Polarizing Film>

A 120 μm thick long length polyvinyl alcohol film was uniaxially stretched (at 110° C. by a factor of 5). The resulting film was immersed for 60 seconds in an aqueous solution comprised of 0.08 g of iodine, 5 g of potassium iodide, and 100 g of water, further immersed at 68° C. in an aqueous solution comprised of 6 g of potassium iodide, 7.5 g of boric acid, and 100 g of water, washed with water, and dried. Thus, a long length polarizing film was obtained.

<Preparation of Polarizing Plate>

The polarizing film obtained above and the saponified film sample as a polarizing plate protective film were laminated to obtain a polarizing plate sample according to the following procedures 1 to 5.

Procedure 1: The film sample obtained above was subjected to saponification in the same manner as above to obtain a polarizing plate protective film.

Procedure 2: The long length polarizing film obtained above was immersed in a polyvinyl alcohol adhesive (with a solid content of 2% by weight) for 1 to 2 seconds to form an adhesive layer.

Procedure 3: The excessive adhesive of the adhesive layer on the polarizing film prepared in Procedure 2 was softly removed. The resulting polarizing film was inserted between two of the polarizing plate protective film so that the polarizing film faced the saponified surface of the polarizing plate protective film. Thus, laminate was obtained.

Procedure 4: The laminate was passed between the two rotating rollers at a pressure of from 20 to 30 N/cm², and at a speed of about 2 m/min. This process was carried out carefully not to introduce air foams in the laminate.

Procedure 5: The laminate obtained in the Procedure 4 was dried at 80° C. for 2 minutes in a dryer. Thus, polarizing plate samples 201 through 215, as shown in Table 2, were prepared.

<Durability of Polarizing Plate Sample>

Two polarizing plate samples with a size of 100 mm×100 mm per each polarizing plate sample were cut, and subjected to heat treatment at 90° C. for 100 hours. Subsequently, one plate was laminated on the other to be arranged in a crossed Nicol state so that the adjacent two sides of one plate were in accordance with those of the other to obtain a polarizing plate laminate. In the edge of the resulting polarizing plate laminate, one plate was longer than the other by a length and the edge of the length turned white. The length of the edge along the central line of the longer plate was measured, and durability of the polarizing plate sample was evaluated according to the following evaluation criteria.

The expression "turned white" means the phenomenon (hereinafter also referred to as whitening) that the edge of the longer plate in the polarizing plate laminate, in which two polarizing plates were arranged in a crossed Nicol state, transmitted light and therefore, appeared white. Such phenomenon, whitening, can be easily judged by visual observation. In a polarizing plate, such phenomenon causes visualization problem in that images at edge portions cannot be observed.

A: The length of the edge was than 5%, and is not problematic for a polarizing plate.

B: the length of the edge was from 5% to less than 10%, and is not problematic for a polarizing plate.

C: The length of one edge was from 10% to less than 20%, and is a lowest level capable of being practically used.

D: The length of one edge turning white was from 20% to less than 50%.

E: The length of one edge was not less than 50%, and is problematic for a polarizing plate.

TABLE 2

| Polarizing plate sample No. | Film composition | | | Durability | Remarks |
|---|---|---|---|---|---|
| | Cellulose derivative | Polycondensation product (content) | Additive (content) | | |
| 201 | TAC | $TiO_2$ (1.5%) | EPEG (1.4%) | B | Inv. |
| 202 | TAC | $TiO_2$ (1.5%) | C-16 (2.8%) | B | Inv. |
| 203 | TAC | $TiO_2$ (1.5%) | DCP (5.6%) | B | Inv. |
| 204 | TAC | $TiO_2$ (1.5%) | EPEG (5.6%)<br>C-16 (5.6%) | A | Inv. |
| 205 | TAC | $SiO_2$ (0.2%) | EPEG (5.6%)<br>C-16 (5.6%)<br>T326 (1.0%) | A | Inv. |
| 206 | TAC | $SiO_2$ (1.5%) | EPEG (5.6%)<br>C-16 (5.6%)<br>T326 (1.0%) | A | Inv. |
| 207 | DAC | $SiO_2$ (20%) | EPEG (5.6%)<br>C-16 (5.6%)<br>T326 (1.0%) | A | Inv. |
| 208 | TAC | $ZrO_2$ (1.5%) | EPEG (5.6%)<br>C-16 (5.6%) | A | Inv. |
| 209 | TAC | $Al_2O_3$ (1.5%) | EPEG (5.6%)<br>C-16 (5.6%) | A | Inv. |
| 210 | CAP | $TiO_2$ (1.5%) | EPEG (5.6%)<br>C-16 (5.6%) | A | Inv. |
| 211 | EC | $TiO_2$ (1.5%) | EPEG (5.6%)<br>C-16 (5.6%) | A | Inv. |
| 212 | TAC | None | EPEG (5.6%)<br>C-16 (5.6%) | C | Comp. |
| 213 | TAC | $TiO_2$ (1.5%) | None | C | Comp. |
| 214 | CAP | None | EPEG (5.6%)<br>C-16 (5.6%) | C | Comp. |
| 215 | CAP | $TiO_2$ (1.5%) | None | C | Comp. |
| 216 | TAC | $SiO_2$ (2.0%)<br>$Al_2O_3$ (1.5%) | EPEG (5.6%)<br>C-16 (5.6%)<br>T109 (0.5%)<br>T171 (0.6%)<br>T326 (0.2%) | A | Inv. |
| 217 | TAC | $SiO_2$ (2.0%)<br>$Al_2O_3$ (1.5%) | EPEG (2.3%)<br>TPP (9.0%)<br>T109 (0.5%)<br>T171 (0.6%)<br>T326 (0.2%) | A | Inv. |
| 218 | TAC | $SiO_2$ (2.0%)<br>$Al_2O_3$ (1.5%) | EPEG (11.5%)<br>C-16 (10.4%)<br>T109 (0.5%)<br>T171 (0.6%) | A | Inv. |
| 219 | TAC | $SiO_2$ (2.0%)<br>$Al_2O_3$ (1.5%) | EPEG (5.6%)<br>C-16 (5.6%)<br>T109 (0.5%)<br>T171 (0.6%)<br>T326 (0.2%) | A | Inv. |

TABLE 2-continued

| Polarizing plate sample No. | Film composition | | Durability | Remarks |
|---|---|---|---|---|
| | Cellulose derivative | Polycondensation product (content) / Additive (content) | | |
| 220 | TAC | $SiO_2$ (2.0%) / EPEG (5.6%) C-16 (5.6%) T109 (0.5%) T171 (0.6%) T326 (0.2%) | A | Inv. |
| 221 | TAC | None / EPEG (2.3%) TPP (9.0%) T109 (0.5%) T171 (0.6%) T326 (0.2%) | C | Comp. |
| 222 | CAP | None / EPEG (2.3%) TPP (9.0%) T109 (0.5%) T171 (0.6%) T326 (0.2%) | D | Comp. |
| 223 | TAC | $SiO_2$ (2.0%) $Al_2O_3$ (1.5%) / EPEG (5.6%) C-16 (5.6%) T109 (0.5%) T171 (0.6%) T326 (0.2%) | A | Inv. |
| 224 | TAC | None / EPEG (2.3%) TPP (9.0%) T109 (0.5%) T171 (0.6%) T326 (0.2%) | D | Comp. |
| 225 | TAC | $SiO_2$ (2.0%) $Al_2O_3$ (1.5%) / EPEG (5.6%) C-16 (5.6%) T109 (0.5%) T171 (0.6%) T326 (0.2%) | A | Inv. |
| 226 | TAC | $SiO_2$ (2.0%) / EPEG (5.6%) C-16 (5.6%) T109 (0.5%) T171 (0.6%) T326 (0.2%) | A | Inv. |
| 227 | TAC | None / EPEG (2.3%) TPP (9.0%) T109 (0.5%) T171 (0.6%) T326 (0.2%) | D | Comp. |

Inv.: Invention,
Comp.: Comparative

In Table 2 above, the content (by weight) of the polycondensation product is shown is shown in terms of the content of oxide of the metal contained in the polycondensation product based on the cellulose derivative, and the content (by weight) of the additive is that based on the cellulose derivative.

It has been confirmed that inventive polarizing plate samples 201 through 211, 216 through 220, 223, 225, and 226 employing, as a polarizing plate protective film, inventive organic-inorganic hybrid film samples 101 through 111, 216 through 220, 223, 225, and 226, respectively, provides excellent durability without causing the phenomenon whitening after high temperature heat treatment. This is considered to be due to the fact that polarizing axis of the polarizing plate samples is stabilized by excellent dimensional stability of the inventive film samples.

Example 3

Inventive Film sample was prepared in the same manner as in Inventive Film sample 101 of Example 1, except that dope 10C was used instead of Dope 1C, stretching was not carried out, and the die gap for casting the dope was adjusted to give a dry film thickness of 100 μm. Thus, Inventive Film sample 301 with a dry thickness of 100 μm was prepared.

Inventive Film sample was prepared in the same manner as in Inventive Film sample 301, except that the transported web was stretched in the transverse direction by a factor of 1.15 at 80° C. in a tenter when the residual solvent content of the web was 10%. Thus, Inventive Film sample 302 was prepared. Similarly, Inventive Film sample 303 was prepared in the same manner as in Inventive Film sample 301, except that the transported web was stretched in the transverse direction by a factor of 1.30 at 80° C. in a tenter when the residual solvent content of the web was 10%.

Film sample 304 was prepared in the same manner as in Inventive Film sample 301 above, except that dope 14C was used instead of Dope 10C. Film sample 305 was prepared in the same manner as in Inventive Film sample 302 above, except that dope 14C was used instead of Dope 10C. Film sample 306 was prepared in the same manner as in Inventive Film sample 303 above, except that dope 14C was used instead of Dope 10C.

Film sample 307 was prepared in the same manner as in Inventive Film sample 301 above, except that dope 15C was used instead of Dope 10C. Film sample 308 was prepared in the same manner as in Inventive Film sample 302 above, except that dope 15C was used instead of Dope 10C. Film sample 309 was prepared in the same manner as in Inventive Film sample 303 above, except that dope 15C was used instead of Dope 10C.

The resulting film samples 301 through 309 were evaluated according to the following procedures. The results are shown in Table 3.

<Measurement of Rate of Birefringence Variation>

Birefringence of the resulting film sample obtained above was measured at wavelength 590 nm at 23° C. and 55% RH by means of an automatic birefringence meter KOBRA-21ADH (produced by Oji Keisokukiki Co., Ltd.), and retardation $R_t$ in the thickness direction and retardation $R_0$ in plane of the film sample were determined. Retardation per 1 μm of the thickness was determined.

Further, the film sample was subjected to high temperature and high humidity conditioning at 35° C. and 80% RH for 72 hours, and retardations $R_t$ and $R_0$ of the resulting film sample were determined. The difference (hereinafter also referred to as retardation variation) between retardations of the film samples before and after the high temperature and high humidity conditioning was determined.

shown in FIG. 2 to form an anti-reflection layer including a metal oxide layer on the anti-glare layer. Thus, anti-reflection film samples 401 through 427, as shown in Table 4, were prepared.

<Anti-Glare Layer Coating Composition>

Fifteen parts of synthetic silica particles with an average particle diameter of 0.5 μm, 10 parts of synthetic silica particles with an average particle diameter of 1.4 μm, 100 parts of a UV curable urethane acrylate resin Unidic 17-806 (produced by Dainippon Ink Co., Ltd.), 1 part of Colonate L (polyisocyanate, produced by Nippon Polyuretanese Co., Ltd.), and 3 parts of a photo-initiator IRUGACURE 184 (produced by Ciba Geigy Co., Ltd.) were incorporated in a solvent ethyl acetate and mixed in a homogenizer to obtain a dispersion solution having a volatile component concentration of 50%.

TABLE 3

| Film sample No. | Film composition Cellulose derivative | Polycondensation product (content) | Additive (content) | Film thickness | Stretching increment | *Retardation at 23° C. and 55% RH $R_0$ | *Retardation at 23° C. and 55% RH $R_t$ | Retardation variation $R_0$ | Retardation variation $R_t$ | Remarks |
|---|---|---|---|---|---|---|---|---|---|---|
| 301 | CAP | TiO$_2$ (1.5%) | EPEG (5.6%) C-16 (5.6%) | 100μ | 5.0% | 2 nm (0.02 nm) | 86 nm (0.86 nm) | +0 nm | +0 nm | Inv. |
| 302 | CAP | TiO$_2$ (1.5%) | EPEG (5.6%) C-16 (5.6%) | 85μ | 15.0% | 31 nm (0.36 nm) | 109 nm (1.28 nm) | +0 nm | −1 nm | Inv. |
| 303 | CAP | TiO$_2$ (1.5%) | EPEG (5.6%) C-16 (5.6%) | 70μ | 30.0% | 59 nm (0.84 nm) | 136 nm (1.94 nm) | −1 nm | −2 nm | Inv. |
| 304 | CAP | None | EPEG (5.6%) C-16 (5.6%) | 100μ | 5.0% | 1 nm (0.01 nm) | 53 nm (0.53 nm) | +0 nm | −1 nm | Comp. |
| 305 | CAP | None | EPEG (5.6%) C-16 (5.6%) | 85μ | 15.0% | 27 nm (0.32 nm) | 77 nm (0.81 nm) | +1 nm | −2 nm | Comp. |
| 306 | CAP | None | EPEG (5.6%) C-16 (5.6%) | 70μ | 30.0% | 48 nm (0.69 nm) | 111 nm (1.59 nm) | −1 nm | −3 nm | Comp. |
| 307 | CAP | TiO$_2$ (1.5%) | None | 100μ | 5.0% | 2 nm (0.02 nm) | 96 nm (0.96 nm) | −1 nm | −5 nm | Comp. |
| 308 | CAP | TiO$_2$ (1.5%) | None | 85μ | 15.0% | 35 nm (0.41 nm) | 114 nm (0.99 nm) | −1 nm | −11 nm | Comp. |
| 309 | CAP | TiO$_2$ (1.5%) | None | 70μ | 30.0% | 63 nm (0.90 nm) | 141 nm (2.01 nm) | −3 nm | −9 nm | Comp. |

*The value in the parenthesis of the column "retardation" represents retardation per 1 μm of the film thickness.
Inv.: Invention,
Comp.: Comparative In Table 3 above, the content (by weight) of the polycondensation product is shown is shown in terms of the content of oxide of the metal contained in the polycondensation product based on the cellulose derivative, and the content (by weight) of the additive is that based on the cellulose derivative.

Inventive Film samples 301 through 303, and Film samples 307 through 309, each obtained by hybridization of titanium oxide with CAP, have $R_0$ per unit thickness and $R_t$ per unit thickness higher than those of Film samples 304 through 306 containing no titanium oxide. Inventive Film samples 301 through 303, and Film samples 307 through 309 are preferred, since necessary $R_0$ and $R_t$ can be obtained with a smaller film thickness and a lower stretching factor.

However, Film samples 307 through 309, containing no plasticizer, show large variation of retardations $R_0$ and $R_t$ after high temperature and high humidity conditioning. Accordingly, Inventive Film samples 301 through 303 are more preferred.

Example 4

The following anti-glare layer coating composition was coated on the film samples 101 through 127 by means of a wire bar coater, dried to form an anti-glare layer, and was subjected to atmospheric pressure plasma treatment employing an atmospheric pressure plasma treatment apparatus as <Atmospheric Pressure Plasma Discharge Treatment>

Discharge was carried out between two opposed electrodes under the following discharge conditions, and gas for forming each of the following layers described below was excited in a plasma state. The anti-glare layer of the film was exposed to the gas in the plasma state to form a metal oxide layer on the anti-glare layer.

Discharge Conditions

Frequency of Power Source: 2 MHz (High frequency power source CF-50000-2M produced by Pearl Kogyo Co., Ltd.)

Power: 6 W/cm$^2$

Pressure: Atmospheric pressure+0.1 kPa

<Reaction Gas as for Medium Refractive Index Layer: Tin Oxide Layer>

| Inert gas (helium) | 98.8% by volume |
|---|---|
| Reactive gas (oxygen gas) | 1.0% by volume |
| Reactive gas (tetrabutyltin) | 0.2% by volume |

<Reaction Gas for High Refractive Index Layer: Titanium Oxide Layer>

| Inert gas (helium) | 98.8% by volume |
| Reactive gas (hydrogen gas) | 1.0% by volume |
| Reactive gas (tetraisopropoxytitanium) | 0.2% by volume |

<Reaction Gas for Low Refractive Index Layer: Silicon Oxide Layer>

| Inert gas (helium) | 98.7% by volume |
| Reactive gas (hydrogen gas) | 1.0% by volume |
| Reactive gas (tetraethoxysilane) | 0.3% by volume |

<Reaction Gas for Anti-Stain Layer>

| Inert gas (helium) | 98.7% by volume |
| Reactive gas (hydrogen gas) | 1.0% by volume |
| Reactive gas (methyltriethoxysilane) | 0.3% by volume |

In the above, the liquids were gasified by means of a vaporizer produced by Rintex Co., Ltd, and incorporated in a helium gas.

The above atmospheric pressure plasma treatment was continuously carried out, and a tin oxide layer (refractive index 1.7, thickness 67 nm), a titanium oxide layer (refractive index 2.14, thickness 110 nm), a silicon oxide layer (refractive index 1.44, thickness 87 nm), and an anti-stain layer (thickness 40 nm) were provided in that order on the anti-glare layer of the film sample. Thus, anti-reflection film samples 401 through 427 were prepared.

The following evaluations were carried out with the anti-reflection film samples 401 through 427.

<Reflectance>

The spectral reflectance of the resulting layer was through in order to prevent light reflection from the rear surface of the film sample opposite the anti-reflection layer, the rear surface was surface-roughened, and subjected to light absorbing treatment employing with black spray to form a light absorbing layer. Reflectance of the resulting film at a wavelength of from 450 nm through 650 nm was measured under condition of a 5° regular reflection, employing a spectrophotometer TYPE 1U-4000 (produced by Hitachi Seisakusho Co., Ltd.), and the average reflectance was determined from the measurements.

<Cracks>

The anti-reflection film sample was subjected to processing in which the sample was stored at 23±2° C. and at 55±5% RH for 12 hours, and then further stored at 80±3° C. and at 90±2% RH for 12 hours. The processing was repeated ten times. After that, the sample was finally stored at 23±2° C. and at 55±5% RH for 12 hours. Then, the surface of the resulting sample was observed through an optical microscope, and evaluated according to the following criteria.

A: No cracks were observed.
B: Small cracks were partially observed.
C: Small cracks were observed over the entire surface of the sample.
D: Innumerable small cracks were observed over the entire surface of the sample.

In the above, rating C and D cannot be put into practical use.

TABLE 4

| Anti-reflection film sample No. | Film composition | | Additive (content) | Average reflectance | Cracks | Remarks |
|---|---|---|---|---|---|---|
| | Cellulose derivative | Polycondensation product (content) | | | | |
| 401 | TAC | TiO$_2$ (1.5%) | EPEG (1.4%) | 0.3% | B | Inv. |
| 402 | TAC | TiO$_2$ (1.5%) | C-16 (2.8%) | 0.3% | B | Inv. |
| 403 | TAC | TiO$_2$ (1.5%) | DCP (5.6%) | 0.3% | B | Inv. |
| 404 | TAC | TiO$_2$ (1.5%) | EPEG (5.6%) C-16 (5.6%) | 0.3% | A | Inv. |
| 405 | TAC | SiO$_2$ (0.2%) | EPEG (5.6%) C-16 (5.6%) T326 (1.0%) | 0.3% | B | Inv. |
| 406 | TAC | SiO$_2$ (1.5%) | EPEG (5.6%) C-16 (5.6%) T326 (1.0%) | 0.3% | A | Inv. |
| 407 | DAC | SiO$_2$ (20%) | EPEG (5.6%) C-16 (5.6%) T326 (1.0%) | 0.3% | A | Inv. |
| 408 | TAC | ZrO$_2$ (1.5%) | EPEG (5.6%) C-16 (5.6%) | 0.3% | A | Inv. |
| 409 | TAC | Al$_2$O$_3$ (1.5%) | EPEG (5.6%) C-16 (5.6%) | 0.3% | A | Inv. |
| 410 | CAP | TiO$_2$ (1.5%) | EPEG (5.6%) C-16 (5.6%) | 0.3% | A | Inv. |
| 411 | EC | TiO$_2$ (1.5%) | EPEG (5.6%) C-16 (5.6%) | 0.3% | A | Inv. |
| 412 | TAC | None | EPEG (5.6%) C-16 (5.6%) | 0.3% | C | Comp. |
| 413 | TAC | TiO$_2$ (1.5%) | None | 0.3% | D | Comp. |
| 414 | CAP | None | EPEG (5.6%) C-16 (5.6%) | 0.3% | C | Comp. |
| 415 | CAP | TiO$_2$ (1.5%) | None | 0.3% | D | Comp. |

TABLE 4-continued

| Anti-reflection film sample No. | Film composition Cellulose derivative | Polycondensation product (content) | Additive (content) | Average reflectance | Cracks | Remarks |
|---|---|---|---|---|---|---|
| 416 | TAC | SiO$_2$ (2.0%) Al$_2$O$_3$ (1.5%) | EPEG (5.6%) C-16 (5.6%) T109 (0.5%) T171 (0.6%) T326 (0.2%) | 0.3% | A | Inv. |
| 417 | TAC | SiO$_2$ (2.0%) Al$_2$O$_3$ (1.5%) | EPEG (2.3%) TPP (9.0%) T109 (0.5%) T171 (0.6%) T326 (0.2%) | 0.3% | A | Inv. |
| 418 | TAC | SiO$_2$ (2.0%) Al$_2$O$_3$ (1.5%) | EPEG (11.5%) C-16 (10.4%) T109 (0.5%) T171 (0.6%) | 0.3% | A | Inv. |
| 419 | TAC | SiO$_2$ (2.0%) Al$_2$O$_3$ (1.5%) | EPEG (5.6%) C-16 (5.6%) T109 (0.5%) T171 (0.6%) T326 (0.2%) | 0.3% | A | Inv. |
| 420 | TAC | SiO$_2$ (2.0%) | EPEG (5.6%) C-16 (5.6%) T109 (0.5%) T171 (0.6%) T326 (0.2%) | 0.3% | A | Inv. |
| 421 | TAC | None | EPEG (2.3%) TPP (9.0%) T109 (0.5%) T171 (0.6%) T326 (0.2%) | 0.3% | D | Comp. |
| 422 | CAP | None | EPEG (2.3%) TPP (9.0%) T109 (0.5%) T171 (0.6%) T326 (0.2%) | 0.3% | D | Comp. |
| 423 | TAC | SiO$_2$ (2.0%) Al$_2$O$_3$ (1.5%) | EPEG (5.6%) C-16 (5.6%) T109 (0.5%) T171 (0.6%) T326 (0.2%) | 0.3% | A | Inv. |
| 424 | TAC | None | EPEG (2.3%) TPP (9.0%) T109 (0.5%) T171 (0.6%) T326 (0.2%) | 0.3% | C | Comp. |
| 425 | TAC | SiO$_2$ (2.0%) Al$_2$O$_3$ (1.5%) | EPEG (5.6%) C-16 (5.6%) T109 (0.5%) T171 (0.6%) T326 (0.2%) | 0.3% | A | Inv. |
| 426 | TAC | SiO$_2$ (2.0%) | EPEG (5.6%) C-16 (5.6%) T109 (0.5%) T171 (0.6%) T326 (0.2%) | 0.3% | A | Inv. |
| 427 | TAC | None | EPEG (2.3%) TPP (9.0%) T109 (0.5%) T171 (0.6%) T326 (0.2%) | 0.3% | C | Comp. |

Inv.: Invention,
Comp.: Comparative

In Table 4 above, the content (by weight) of the polycondensation product is shown is shown in terms of the content of oxide of the metal contained in the polycondensation product based on the cellulose derivative, and the content (by weight) of the additive is that based on the cellulose derivative.

As is apparent from Table 4 above, the atmospheric pressure plasma discharge treatment provides a low reflective anti-reflection film sample, however, numerous small cracks were observed in comparative anti-reflection film samples 412 through 415, 421, 422, 424, and 427, while not in inventive anti-reflection film samples 401 through 411, 416 through 420, 423, 424, and 426. The inventive anti-reflection film samples 401 through 411 were good anti-reflection films.

[Effect of the Invention]

The present invention provides an organic-inorganic hybrid film with low moisture vapor transmittance, high dimensional stability and high retardation stability.

Use of the organic-inorganic hybrid film of the invention provides a polarizing plate with excellent durability and without whitening, an optical retardation film with a large retardation per unit thickness, and an anti-reflection film which is difficult to produce cracks.

What is claimed is:

1. An organic-inorganic hybrid film comprising a cellulose derivative and a polycondensation product of a condensation polymerizable reactive metal compound, wherein the film contains a plasticizer in an amount of 1 to 20% by weight.

2. The organic-inorganic hybrid film of claim 1, wherein the plasticizer is a polyhydric alcohol ester having an aromatic ring or a cycloalkyl ring in the molecule or a glycolate having an aromatic ring or a cycloalkyl ring in the molecule.

3. The organic-inorganic hybrid film of claim 1, wherein when the condensation polymerizable reactive metal compound is represented by $A_pM_qB_r$, and the polycondensation product by $A_pM_qO_{r/2}$ as shown in the following formula 1, the hybrid film contains the polycondensation product in an amount of 0.1 to 40% by weight,

$$A_pM_qB_r \rightarrow A_pM_qO_{r/2} \qquad \text{formula 1}$$

wherein M represents a central metal atom, A represents a univalent substituent which is not hydrolyzed, B represents a substituent capable of being hydrolyzed, and p, q and r represent an integer.

4. The organic-inorganic hybrid film of claim 3, wherein the hybrid film contains the polycondensation product in an amount of 0.5 to 5% by weight.

5. The organic-inorganic hybrid film of claim 1, wherein the condensation polymerizable reactive metal compound is a metal alkoxide having a metal selected from the group consisting of Si, Ti, Zr and Al or a double metal alkoxide having two metals selected from the group consisting of Si, Ti, Zr and Al.

6. The organic-inorganic hybrid film of claim 1, wherein the cellulose derivative is a cellulose ester.

7. The organic-inorganic hybrid film of claim 1, wherein the hybrid film has a retardation in the thickness direction $R_t$ of from 70 to 300 nm, a retardation in the plane $R_0$ of from 30 to 1000 nm, or both a retardation in the thickness direction $R_t$ of from 70 to 300 nm and a retardation in the plane $R_0$ of from 30 to 1000 nm, the $R_t$ and $R_0$ being represented by the following formulas 2 and 3, $$Rt = \{(nx+ny)/2 - nz\} \times d \qquad \text{Formula 2}$$

$$Rt = (nx-ny) \times d \qquad \text{Formula 3}$$

wherein nx represents a refractive index in the plane in the direction giving maximum refractive index in the plane, ny represents a refractive index in the plane in the direction perpendicular to the direction giving the nx, nz represents a refractive index in the film thickness direction, and d represents a thickness (nm) of the film.

8. The organic-inorganic hybrid film of claim 7, wherein the hybrid film has both a retardation in the thickness direction $R_t$ of from 70 to 300 nm and a retardation in the plane $R_0$ of from 30 to 1000 nm.

9. The organic-inorganic hybrid film of claim 1, wherein the polycondensation product has an average particle diameter of 1 to 100 nm.

10. The organic-inorganic hybrid film of claim 9, wherein the polycondensation product has an average particle diameter of 1 to 50 nm.

11. The organic-inorganic hybrid film of claim 10, wherein the polycondensation product has an average particle diameter of 1 to 20 nm.

12. A method of manufacturing an organic-inorganic hybrid film comprising a cellulose derivative and a polycondensation product of a condensation polymerizable reactive metal compound, the film containing a plasticizer in an amount of 1 to 20% by weight, the method comprising the step of:

providing a solution containing a cellulose derivative, a polycondensation product of a condensation polymerizable reactive metal compound, a plasticizer, and a solvent; and casting the resulting solution on a support.

13. The method of claim 12, wherein the solution contains water in an amount of 0.01 to 2.0% by weight.

* * * * *